(12) United States Patent
Shiki

(10) Patent No.: US 9,802,842 B2
(45) Date of Patent: Oct. 31, 2017

(54) HOLLOW FIBER MEMBRANE MODULE AND FILTERING METHOD

(71) Applicant: ASAHI KASEI CHEMICALS CORPORATION, Tokyo (JP)

(72) Inventor: Satoshi Shiki, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 113 days.

(21) Appl. No.: 14/591,244

(22) Filed: Jan. 7, 2015

(65) Prior Publication Data

US 2015/0197431 A1    Jul. 16, 2015

(30) Foreign Application Priority Data

Jan. 10, 2014  (JP) ................................ 2014-003669

(51) Int. Cl.
| | | |
|---|---|---|
| *B01D 63/02* | (2006.01) | |
| *C02F 1/44* | (2006.01) | |
| *C02F 103/04* | (2006.01) | |

(52) U.S. Cl.
CPC .............. *C02F 1/444* (2013.01); *B01D 63/02* (2013.01); *B01D 63/021* (2013.01);
(Continued)

(58) Field of Classification Search
CPC ........ B01D 61/08; B01D 61/18; B01D 61/28; B01D 63/02; B01D 63/021; B01D 63/022;
(Continued)

(56) References Cited

U.S. PATENT DOCUMENTS

| | | |
|---|---|---|
| 2003/0173706 A1 | 9/2003 | Rabie et al. |
| 2007/0039868 A1 | 2/2007 | Ishibashi |
| | (Continued) | |

FOREIGN PATENT DOCUMENTS

| | | |
|---|---|---|
| CN | 1859966 | 11/2006 |
| CN | 202343103 | 7/2012 |
| | (Continued) | |

OTHER PUBLICATIONS

English language machine translation of CN202343103, 29 pages, No Date.*

*Primary Examiner* — Pranav Patel
(74) *Attorney, Agent, or Firm* — Greenblum & Bernstein, P.L.C.

(57) ABSTRACT

A hollow fiber membrane module comprising a bundle of hollow fiber membranes, a housing, an adhesive fixation layer, an inlet and outlet, at least one bias regulating member, and at least one straightening cylinder, in which the bias regulating member is contained in the adhesive fixation layer, the adhesive fixation layer comprises an outer end surface and an inner end surface inside the straightening cylinder, at least some of spaces between the hollow fiber membranes are at least three times as large as an outer diameter of the hollow fiber membrane on the outer end surface of the adhesive fixation layer, and the spaces between the hollow fiber membranes and a space from the hollow fiber membranes to the straightening cylinder are all less than three times as large as the outer diameter of the hollow fiber membrane on the inner end surface of the adhesive fixation layer.

15 Claims, 9 Drawing Sheets

(52) U.S. Cl.
CPC ........ *B01D 63/022* (2013.01); *B01D 2313/23* (2013.01); *C02F 2103/04* (2013.01)

(58) Field of Classification Search
CPC .............. B01D 69/08; B01D 2201/043; B01D 2201/0438; B01D 2201/0446; B01D 2201/0453; B01D 2201/291; B01D 2313/04; B01D 2313/14; B01D 2313/20; B01D 2313/21; B01D 2313/23
See application file for complete search history.

(56) References Cited

U.S. PATENT DOCUMENTS

2007/0228602 A1* 10/2007 Cote .................... B01D 63/022
264/257
2013/0306545 A1 11/2013 Shinohara et al.

FOREIGN PATENT DOCUMENTS

| | | |
|---|---|---|
| EP | 0 841 086 | 5/1998 |
| JP | 7-102307 B2 | 11/1995 |
| JP | 2000-037616 | 2/2000 |
| JP | 2000-185220 | 7/2000 |
| JP | 2000-210538 | 8/2000 |
| JP | 2004-050011 | 2/2004 |
| JP | 2004-050175 | 2/2004 |
| JP | 2011-025156 | 2/2011 |
| JP | 2012-045453 | 3/2012 |
| JP | WO2012/091070 | 7/2012 |
| WO | 97/10893 | 3/1997 |

* cited by examiner

HOLLOW FIBER MEMBRANE MODULE AND FILTERING METHOD

BACKGROUND OF THE INVENTION

Field of the Invention

The present invention relates to a hollow fiber membrane module suitable as a final filter that removes particulates in water to be treated in a ultrapure water manufacturing process.

Related Background Art

In a line where ultrapure water used to manufacture electronic and electric components such as semiconductors and display elements, a membrane filter module is used as a final filter that removes particulates from ultrapure water manufactured using microfiltration membranes and an ion exchange resin or reverse osmosis membranes immediately before the ultrapure water is supplied to a use point. As a membrane filter module for this application, an external-pressure hollow fiber membrane module that supplies raw water to the outside of a hollow fiber membrane to filter the water is used because the hollow fiber membrane module has the advantage of enabling an increase in filtration flow rate per module.

With a recent increase in the amount of production of electronic and electric products, the amount of ultrapure water used has been increasing. On the other hand, miniaturization of semiconductor elements has been progressing. In such circumstances, there has been a demand for a hollow fiber membrane module having a high filtration capability, that is, a hollow fiber membrane module which has a high filtration flow rate per module and which enables particulates to be reliably removed.

However, in the conventional external-pressure hollow fiber membrane module, when the amount of water supply is increased to increase throughput per unit time, water flows through the hollow fiber membrane module at a high speed. Thus, a phenomenon in which the hollow fiber membrane oscillates violently may occur and last to fatigue and break the hollow fiber membrane. As a result, particulates flow into filtrate to degrade water quality. As a method for preventing damage done to the hollow fiber membranes by a water flow, a method has been proposed in which a protective straightening cylinder is provided around a bundle of hollow fiber membranes (see Japanese Examined Patent Publication No. H07-102307 and Japanese Patent Application Laid-Open No. 2000-37616).

Furthermore, when a bundle of hollow fiber membranes is housed in a housing and fixed at opposite ends of the bundle using adhesive fixation layers, the density distribution of the hollow fiber membranes is likely to be biased. When the hollow fiber membranes are formed with a large bias retained, a bias of a water flow occurs in the module. Thus, the hollow fiber membranes oscillate and are consequently broken. To prevent such a bias of the density distribution of the hollow fiber membranes, the housing may be filled with the bundle of hollow fiber membranes as densely as possible to eliminate gaps that may lead to a bias. However, such a method poses the following problem. Even channels of water flowing among the hollow fiber membranes and through the housing are narrowed to increase resistance to the water flow. Thus, operation power is increased, and moreover, when the external-pressure configuration is used for filtration, the hollow fiber membranes come into tight contact with one another to reduce an effective membrane surface for filtration. Accordingly, a rise in transmembrane pressure difference is accelerated.

To solve this problem, for example, members serving as spacers (partitioning plates) may be inserted into the bundle of hollow fiber membranes (see Japanese Patent Application Laid-Open No. 2011-25156). However, in such a method, the partitioning plates serving as the spacers and the hollow fiber membranes come into contact one another, and the hollow fiber membranes may be damaged and fail to provide an original separation capability or may be broken.

On the other hand, a hollow fiber membrane module is known in which an insertion object that prevents a bias of the density distribution of the hollow fiber membranes is fixedly inserted into an adhesive fixation layer (see WO97/10893 and Japanese Patent Application Laid-Open No. 2012-45453). In such a hollow fiber membrane module, since the insertion object is present in the adhesive fixation layer, the contact between the spacers and the hollow fiber membranes as described above is avoided, while the hollow fiber membranes pushed away by the insertion of the insertion object have smaller spaces between the membranes. As a result, the hollow fiber membranes present in the areas other than the area into which the insertion object has been inserted can be made uniform in density distribution.

SUMMARY OF THE INVENTION

When the straightening cylinder is installed and the insertion object used to prevent a bias of the hollow fiber membranes is inserted into the adhesive fixation layer, the bias of the density distribution of the hollow fiber membranes is definitely reduced. However, even with the insertion of the insertion object, the bias of the water flow may not sufficiently be eliminated when the amount of filtrate per module is increased. This may cause the hollow fiber membranes to be broken, with the result that particulates leak out into the filtrate.

An object of the present invention is to solve the above-described problems and provide a hollow fiber membrane module and a filtration method which prevent hollow fiber membranes from being broken and evenly distribute the hollow fiber membranes to prevent an increase in filtration resistance, allowing high filtrate quality to be maintained over a long period of time.

The inventors earnestly conducted studies and verifications in order to determine the cause of breakage of the hollow fiber membranes. As a result, the inventors have obtained the following knowledge to arrive at the present invention. For example, in a hollow fiber membrane module in which a conventional insertion object is inserted into each of the ends of the bundle of hollow fiber membranes and which is surrounded at each end of the module by a conventional straightening cylinder and bonded, mostly root portions of the hollow fiber membranes exposed from the adhesive fixation layer and extending into the straightening cylinder are broken when the amount of filtrate is increased. Moreover, the broken portions concentrate in an area where the hollow fiber membranes are intentionally pushed away from one another by the insertion of the insertion object to increase the spaces between the membranes and in an outermost peripheral portion of the bundle of hollow fiber membranes.

That is, an embodiment of the present invention is a hollow fiber membrane module comprising a bundle of hollow fiber membranes comprising a plurality of hollow fiber membranes, a housing that houses the bundle of hollow fiber membranes, an adhesive fixation layer that adhesively fixes the bundle of hollow fiber membranes to the housing at opposite ends of the bundle, an inlet and outlet for a fluid provided on the housing, at least one bias regulating member disposed in at least one end of the bundle of hollow fiber membranes in order to reduce a bias of a density distribution of the hollow fiber membranes in the bundle of hollow fiber membranes, and at least one straightening cylinder surrounding a part of the end side of the bundle of hollow fiber membranes, in which a part of the straightening cylinder is fixed to the adhesive fixation layer, the bias regulating member is contained in the adhesive fixation layer, the adhesive fixation layer comprises an outer end surface in which the hollow fiber membranes are open and an inner end surface formed opposite the outer end surface and inside the straightening cylinder, at least some of spaces between the hollow fiber membranes formed as a result of disposition of the bias regulating member are at least three times as large as an outer diameter of the hollow fiber membrane on the outer end surface of the adhesive fixation layer, and the spaces between the hollow fiber membranes and a space from the hollow fiber membranes to the straightening cylinder are all less than three times as large as the outer diameter of the hollow fiber membrane on the inner end surface of the adhesive fixation layer.

In the hollow fiber membrane module, the bias regulating member is disposed in at least one end of the bundle of hollow fiber membranes, and thus, the bias of the density distribution of the hollow fiber membranes can be reduced at this end. A part of the end side of the bundle of hollow fiber membranes is surrounded by the straightening cylinder to allow the hollow fiber membranes to be protected from violent vibration. Now, a reduction in the bias of the density distribution of the hollow fiber membrane will be described in further detail. Spaces are formed among the hollow fiber membranes as a result of disposition of the bias regulating member on the outer end surface of the adhesive fixation layer in which the hollow fiber membranes are open. At least some of the spaces are at least three times as large as the outer diameter of the hollow fiber membrane. As a result, in areas where no bias regulating member is disposed, the hollow fiber membranes are densely assembled to allow unevenness of the density distribution of the hollow fiber membranes to be corrected. On the other hand, the spaces between the hollow fiber membranes and a space from the hollow fiber membranes to the straightening cylinder are all less than three times as large as the outer diameter of the hollow fiber membrane on the inner end surface of the adhesive fixation layer. As a result, the spaces between the hollow fiber membranes and the space from the hollow fiber membrane to the straightening cylinder are made equal to allow the unevenness of the density distribution of the hollow fiber membranes to be corrected. Consequently, the hollow fiber membranes are effectively restrained from being broken at the root portions thereof by water flowing in between the bundle of hollow fiber membranes and the straightening cylinder on the inner end surface.

Furthermore, in the above-described embodiment, the hollow fiber membrane module may be configured such that a value resulting from division of a height of the bias regulating member by a thickness of the adhesive fixation layer is 0.5 or more and less than 0.8. The disposition of the bias regulating member in this manner reduces the impact of the bias regulating member on the inner end surface side (the root portion side of the hollow fiber membranes), which is opposite to the outer end surface of the adhesive fixation layer. This consequently prevents a situation where some of the spaces between the root portions of the hollow fiber membranes are locally widened. The spaces between the hollow fiber membranes and the space from the hollow fiber membranes to the straightening cylinder are made equal to allow the unevenness of the density distribution of the hollow fiber membranes to be corrected. As a result, the hollow fiber membranes are effectively restrained from being broken at the root portions thereof by water flowing in between the bundle of hollow fiber membranes and the straightening cylinder on the inner end surface.

Furthermore, in the above-described embodiment, the hollow fiber membrane module may be configured such that a plurality of types of the bias regulating members with different shapes are disposed in the adhesive fixation layer so as to be combined together. The use of a combination of a plurality of types of the bias regulating members with different shapes enables easy adjustment of the spaces between the hollow fiber membranes on the above-described outer end surface and on the above-described inner end surface.

Additionally, in the above-described embodiment, the hollow fiber membrane module may be configured such that the bias regulating members shaped like plates and the bias regulating members shaped like rods are disposed in the adhesive fixation layer so as to be combined together and that a value resulting from division of a height of the rod-like bias regulating members by the thickness of the adhesive fixation layer is larger than a value resulting from division of a height of the plate-like bias regulating members by the thickness of the adhesive fixation layer. The distribution of the hollow fiber membranes in the outer end surface and in the inner end surface can be more reliably adjusted by, for example, dividing the bundle of hollow fiber membranes into a number of partitions using the plate-like bias regulating members and inserting the rod-like bias regulating members into each of the resultant partitions.

In addition, in the above-described embodiment, the hollow fiber membrane module may be configured such that the value resulting from the division of the height of the plate-like bias regulating members by the thickness of the adhesive fixation layer may be at least 0.5 and less than 0.7 and that the value resulting from the division of the height of the rod-like bias regulating members by the thickness of the adhesive fixation layer may be at least 0.6 and less than 0.8. The use of the bias regulating members within such ranges allows more reliable adjustment of the distribution of the hollow fiber membranes in the outer end surface and in the inner end surface.

Furthermore, in the above-described embodiment, the hollow fiber membrane module may be configured such that a ratio between a height h of the straightening cylinder from the inner end surface of the adhesive fixation layer and an inner diameter d of the straightening cylinder is at least 0.7 and less than 1.1. With this range, water to be treated which has been introduced into the hollow fiber membrane module can be prevented from coming into direct contact with a hollow fiber bundle, and a velocity at which the water to be treated with a direction thereof changed by the straightening cylinder flows into the hollow fiber membranes can be kept at a low speed. Thus, breakage of the hollow fiber membranes can further be suppressed.

Additionally, in the above-described embodiment, the hollow fiber membrane module may be configured such that the inner end surface side of the bias regulating member is tapered. The use of such bias regulating member allows the bias regulating member to be installed without damaging the hollow fiber membranes when the bias regulating member is inserted into the bundle of hollow fiber membranes.

Furthermore, a filtration method using the hollow fiber membrane module according to the above-described embodiment may comprise supplying water to be treated to an area outside the hollow fiber membranes in the housing and retrieving treated water having permeated the hollow fiber membranes through openings of the hollow fiber membranes. Thus, the filtration method using each of the above-described hollow fiber membrane modules enables efficient filtration of a large amount of water to be treated.

Additionally, in the above-described filtration method, the treated water may be ultrapure water. Even in an application such as an ultrapure water application which demands water with stably high quality, each of the above-described hollow fiber membrane modules are unlikely to cause the hollow fiber membranes to be broken and suffers only a low pressure loss resulting from filtration. This allows preferable filtrate to be continuously generated.

The above-described hollow fiber membrane module and filtration method according to the embodiment prevent the hollow fiber membranes from being broken to allow water with stably high quality to be generated over a long period of time.

DESCRIPTION OF THE PREFERRED EMBODIMENTS

An example of a hollow fiber membrane module according to an embodiment of the present invention will be described below with reference to the drawings. An example of the embodiment is illustrated herein; and the present invention is not limited to the embodiments described below.

A hollow fiber membrane module 1 (see FIG. 1) according to the present embodiment is utilized in a filtration apparatus 100 (see FIG. 8) for manufacturing ultrapure water. For example, the hollow fiber membrane module 1 is utilized for external pressure filtration performed immediately before ultrapure water manufactured using a microfiltration membrane, an ion exchange resin, or a reverse osmosis membrane is supplied to a use point, and functions as a final filter (security filter). Furthermore, to make facilities compact, the hollow fiber membrane module 1 is demanded to provide a high filtration capability. That is, the hollow fiber membrane module 1 is a module having a high filtration flow rate per module and per unit volume.

Figure 1:
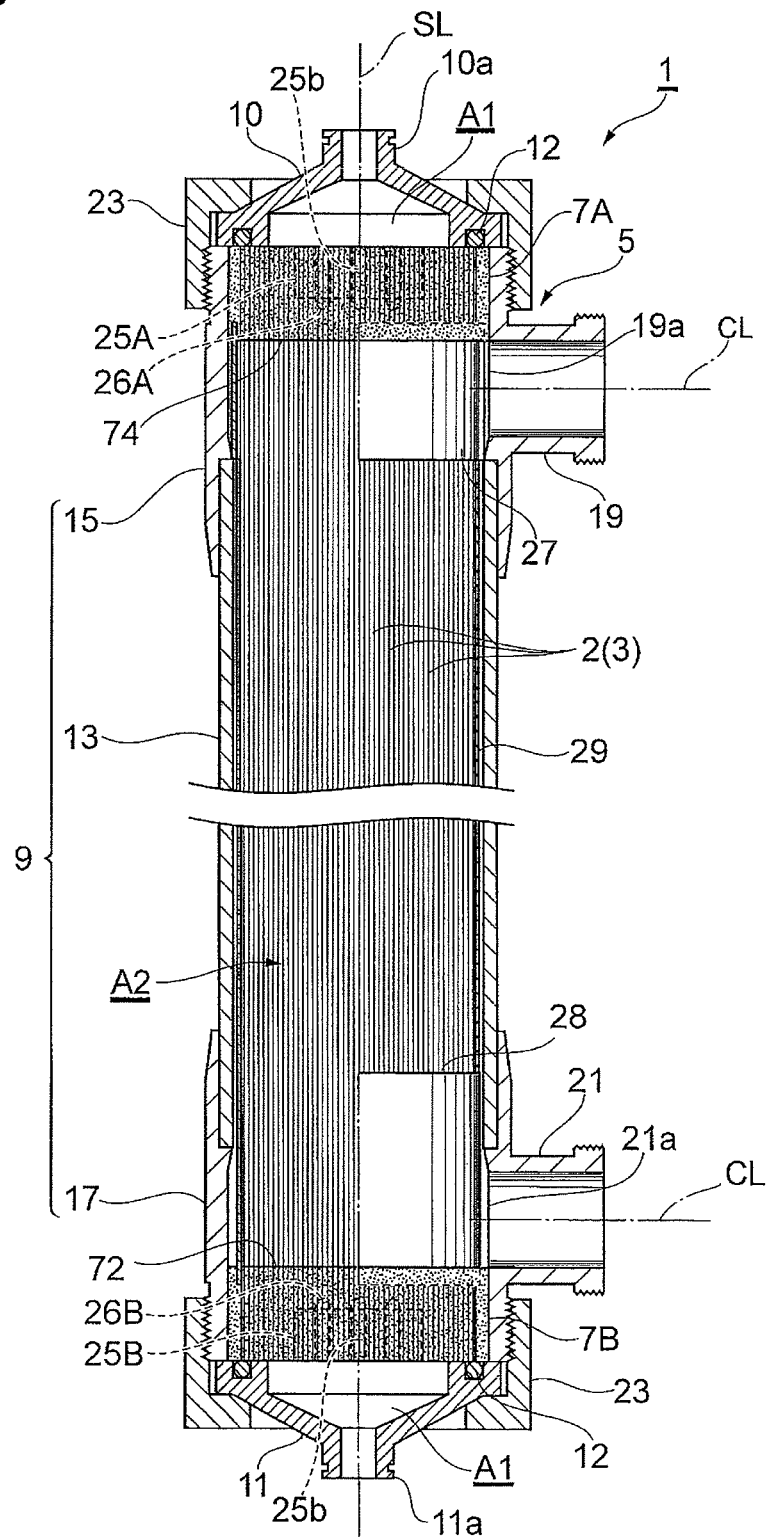
FIG. 1 is a cross-sectional view depicting a hollow fiber membrane module according to an embodiment of the present invention.
Figure 2:
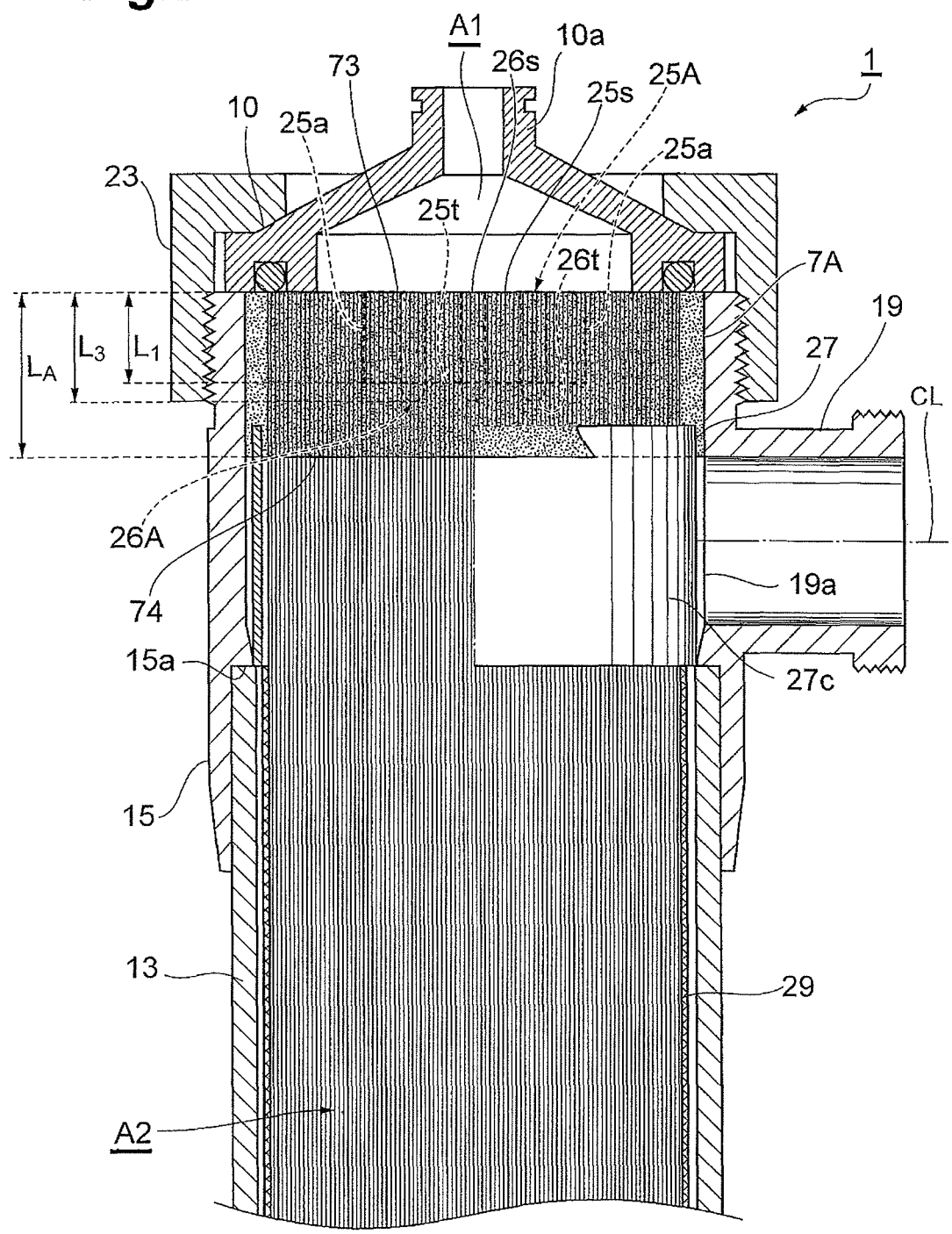
FIG. 2 is an enlarged cross-sectional view of an upper end of the hollow fiber membrane module in FIG. 1.
Figure 3:
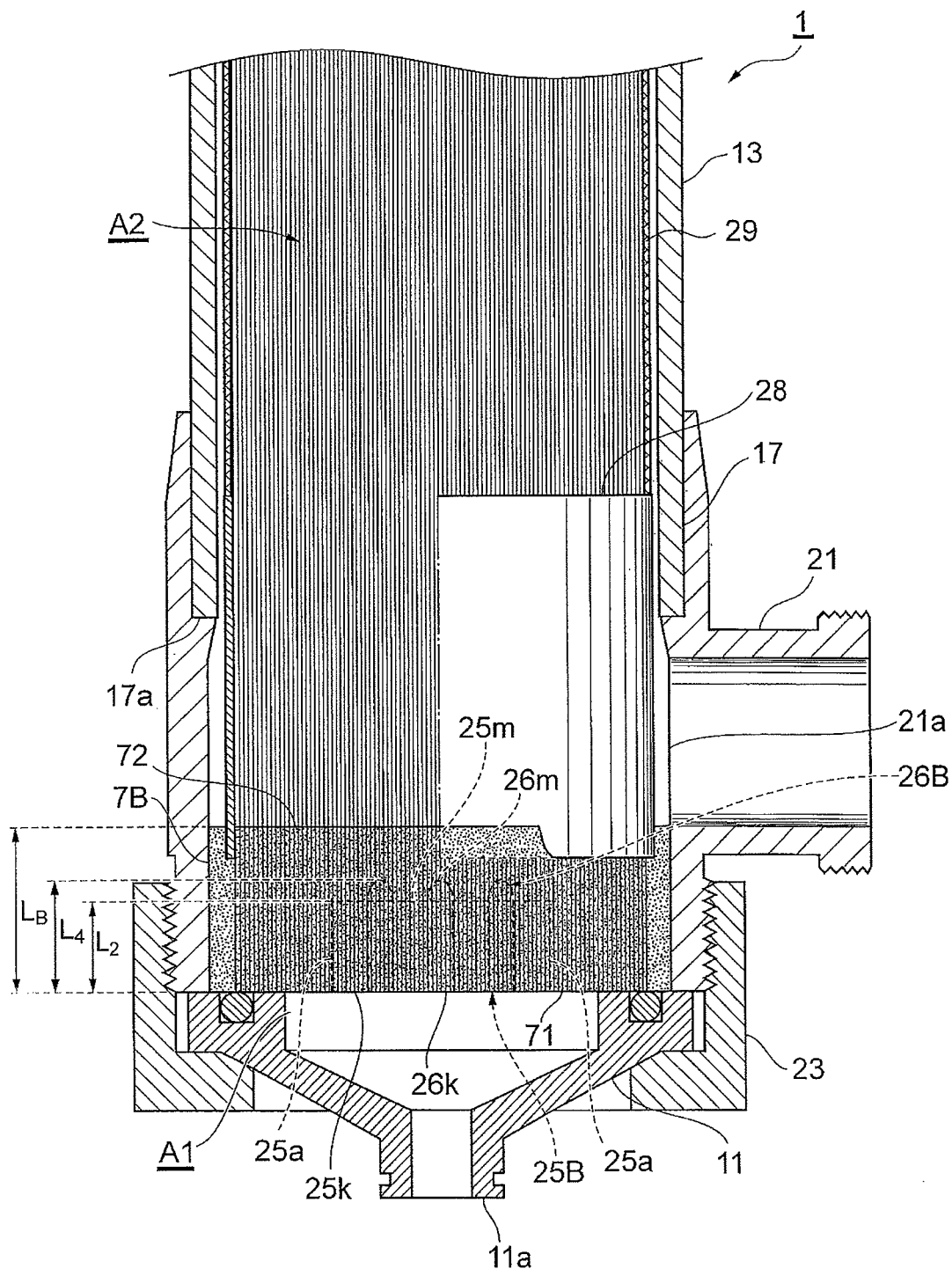
FIG. 3 is an enlarged cross-sectional view of a lower end of the hollow fiber membrane module in FIG. 1.
Figure 4:
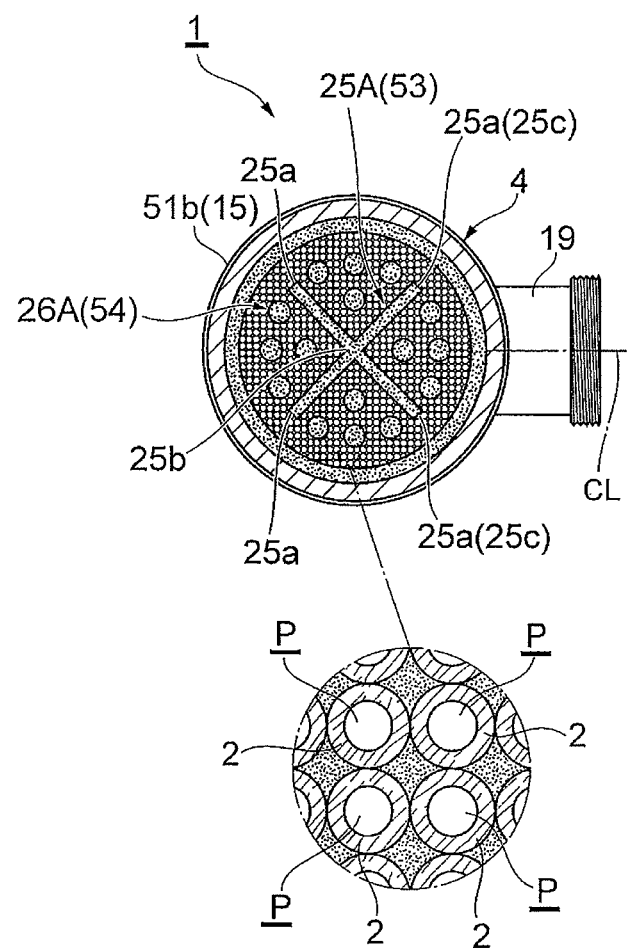
FIG. 4 is an enlarged diagram depicting an upper end surface of a bundle of hollow fiber membrane.

As depicted in FIGS. 1 to 3, the hollow fiber membrane module 1 comprises a bundle of hollow fiber membranes 3 comprising a plurality of hollow fiber membranes 2 each with openings P (see FIG. 4) at opposite ends thereof, a housing 5 that houses the bundle of hollow fiber membranes 3, and adhesive fixation layers 7A, 7B which adhesively fix opposite ends of the bundle of hollow fiber membranes 3 to the housing 5 and which define a first area A1 in which openings P of the hollow fiber membranes 2 are exposed and a second area A2 that communicates with the first area A1 via the hollow fiber membranes 2.

The housing 5 comprises a cylindrical housing main body 9, a line connection cap (hereinafter referred to as a "header cap") 10, and a line connection cap (hereinafter referred to as a "bottom cap") 11 attached to a lower end of the housing main body 9.

The housing main body 9 comprises a header portion 15 to which the header cap 10 is attached, a bottom portion 17 to which the bottom cap 11 is attached, and a body portion 13 disposed between the header portion 15 and the bottom portion 17 to be adhesively integrated with the header portion 15 and the bottom portion 17. The header portion 15 is provided with an upper nozzle (an inlet and outlet for a fluid) 19 through which a fluid flows in and out. The bottom portion 17 is provided with a lower nozzle (an inlet and outlet for the fluid) 21 through which the fluid flows in and out. The upper nozzle 19 and the lower nozzle 21 are provided to project in a direction orthogonal to an axis SL of the housing main body 9.

The header cap 10 is provided with a conduit (an inlet and outlet for the fluid) 10a through which the fluid flows in and out. The header cap 10 is fixed to an upper end of the housing 5 by tightening a cap nut 23. Furthermore, the bottom cap 11 is similarly provided with a conduit (an inlet and outlet for the fluid) 11a through which the fluid flows in and out. The bottom cap 11 is fixed to a lower end of the housing main body 9 by tightening a cap nut 23.

Bias regulating members 25A, 25B, 26A, and 26B are disposed inside a lower end and an upper end of the bundle of hollow fiber membranes 3 housed in the housing 5 in order to reduce a bias of the density distribution of the plurality of hollow fiber membranes 2. As the bias regulating members 25A, 25B, 26A, and 26B, for example, plate-like members or rod-like (columnar) members may be appropriately selected. In the present embodiment, the bias regulating members 25A, 25B are shaped like flat plates, and the bias regulating members 26A, 26B are shaped like rods. In the present embodiment, the bias regulating members 25A, 25B, 26A, and 26B are inserted in each of the opposite ends of the bundle of hollow fiber membranes 3 to reduce the bias of the density distribution of the hollow fiber membranes 2 at the opposite ends thereof. An aspect is also possible in which the bias regulating members 25A, 25B, 26A, and 26B are inserted into only one end of the bundle of hollow fiber membranes 3. Even in that aspect, the bias regulating members 25A, 25B, 26A, and 26B inserted in only one end reduce the bias of the density distribution of the hollow fiber membranes 2 at the one end of the bundle of hollow fiber membranes 3.

In the present embodiment, as an example of the bias regulating members, cross plates 25A, 25B and insertion rods 26A, 26B will be described by way of example; cross plates 25A, 25B comprise two rectangular flat plates crossing each other at right angles and having an X-shaped cross section, and the insertion rods 26A, 26B comprise a plurality of rod-like members.

Figure 5:
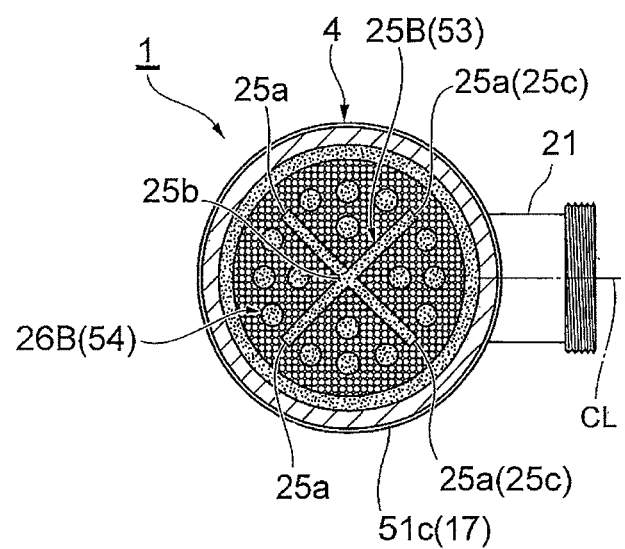
FIG. 5 is an enlarged diagram depicting a lower end surface of the bundle of hollow fiber membrane.

The cross plates 25A, 25B comprise a line-of-intersection portion 25b between the two rectangular flat plates which is disposed along a longitudinal direction of the bundle of hollow fiber membranes 3. The cross plates 25A, 25B comprise four plate piece portions 25a (see FIG. 4 and FIG. 5) projecting radially from the line-of-intersection portion 25b. The upper end or lower end of the bundle of hollow fiber membranes 3 is substantially evenly divided into four partitions by the four plate piece portions 25a to correct the bias of the distribution of the hollow fiber membranes 2.

Furthermore, the insertion rods 26A, 26B are disposed such that an extension direction of the insertion rods 26A, 26B lies along the longitudinal direction of the bundle of hollow fiber membranes 3. The insertion rods 26A, 26B are inserted in each of the four partitions into which the bundle is substantially evenly divided by the cross plates 25A, 25B in a number necessary for correcting the bias of the density distribution of the hollow fiber membranes 2. For example, the insertion rods 26A, 26B are substantially evenly disposed on circumferences of concentric circles around the line-of-intersection portion 25b in each partition (see FIG. 4 and FIG. 5). The bias of the density distribution of the hollow fiber membranes 2 is corrected by the cross plates 25A, 25B and the insertion rods 26A, 26B.

The cross plates 25A, 25B are disposed in the adhesive fixation layers 7A, 7B so as not to lie opposite the upper nozzle 19 or the lower nozzle 21. Specifically, a side edge 25c of each plate piece portion 25a is disposed to be misaligned with a virtual plane containing a centerline CL of the upper nozzle 19 or the lower nozzle 21 and an axis SL of the housing main body 9.

Straightening cylinders 27, 28 are installed at the respective opposite ends of the bundle of hollow fiber membranes 3. The straightening cylinders 27, 28 are provided to maintain a space between the bundle of hollow fiber membranes 3 and an inner surface of the housing main body 9 near the upper nozzle 19 or the lower nozzle 21. The straightening cylinders 27, 28 are cylindrical components provided to surround an outer periphery of the bundle of hollow fiber membranes 3. Parts of the adhesive fixation layers 7A, 7B are buried and fixed in the adhesive fixation layers 7A, 7B, respectively. In the present embodiment, the bundle of hollow fiber membranes 3 is surrounded at the opposite ends thereof by the straightening cylinders 27, 28 to allow the opposite ends of the hollow fiber membranes 2 to be protected from violent vibration at the time of filtration. An aspect is also possible in which the straightening cylinders 27, 28 are disposed at only one end of the bundle of hollow fiber membranes 3. In the aspect, the straightening cylinders 27, 28 disposed at the one end allow the hollow fiber membranes 2 to be protected from violent vibration at one end thereof.

It is preferable that the length of the upper-end-side straightening cylinder 27 in a direction along the axis SL of the housing main body 9 (the longitudinal direction of the bundle of hollow fiber membranes 3) extend from an inner end surface 74 of the adhesive fixation layer 7A to a lower position beyond an inner opening 19a of the upper nozzle 19 and that the upper-end-side straightening cylinder 27 have a length sufficient to interfere with a flow of a fluid by lying opposite the opening 19a. Similarly, it is preferable that the length of the lower-end-side straightening cylinder 28 extend from an inner end surface 72 of the adhesive fixation layer 7B to an upper position beyond an inner opening 21a of the lower nozzle 21 and that the lower-end-side straightening cylinder 28 have a length sufficient to interfere with a flow of a fluid by lying opposite the opening 21a.

In the present embodiment, the upper-end-side straightening cylinder 27 is cylindrical and a part (upper end) of the upper-end-side straightening cylinder 27 is buried and fixed in the adhesive fixation layer 7A. Furthermore, the lower-end-side straightening cylinder 28 is cylindrical and a part (lower end) of the lower-end-side straightening cylinder 28 is buried and fixed in the adhesive fixation layer 7B. In this regard, the upper-end-side straightening cylinder 27 and the lower-end-side straightening cylinder 28 may be the same or different in shape.

Figure 6:
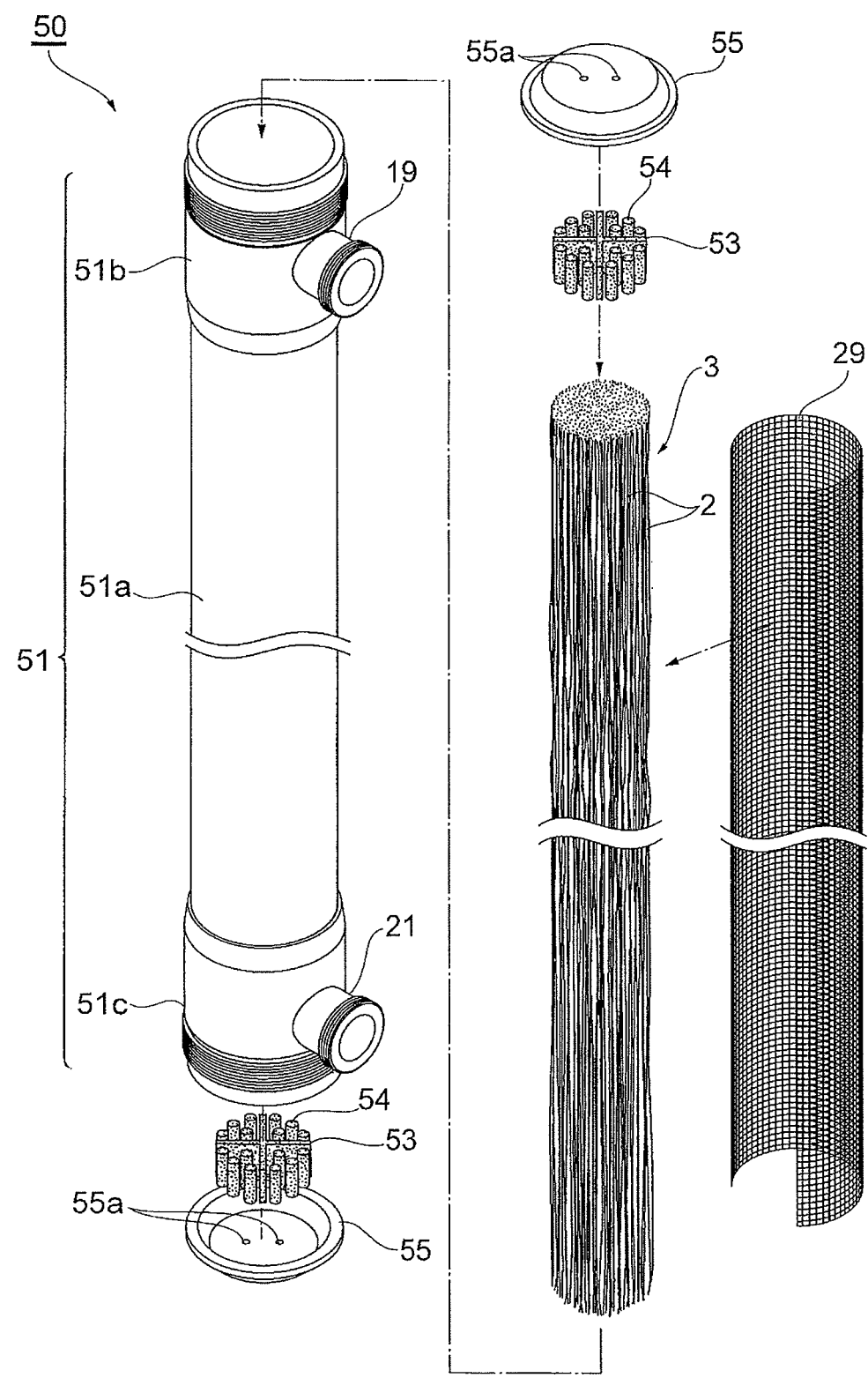
FIG. 6 is an exploded perspective view of a module preassembly prepared in order to manufacture the hollow fiber membrane module.

Additionally, as depicted in FIG. 1 and FIG. 6, a net-like contact prevention member 29 is wound and installed around an outer periphery of a longitudinally central portion of the bundle of hollow fiber membranes 3. The number of windings of the contact prevention member 29 is normally one. The hollow fiber membranes 2 are adapted to be restrained from coming into contact with the straightening cylinders 27, 28 and, on the other hand, to be prevented from offering excessive resistance to the flow of water to be treated. Furthermore, the single winding is effective for suppressing an increase in the sizes of the bundle of hollow fiber membranes 3 and contact prevention member 29 inserted in the housing main body 9 of the hollow fiber membrane module 1.

As depicted in FIGS. 1 to 3, the adhesive fixation layers 7A, 7B are formed at an upper position and a lower position, respectively, in the housing 5. The upper adhesive fixation layer 7A contains and integrally anchors the upper end of the bundle of hollow fiber membranes 3, the cross plate 25A, and the insertion rod 26A together. Moreover, an upper portion of the upper-end-side straightening cylinder 27 is integrally buried in the adhesive fixation layer 7A and fixed to an inner surface of the header portion 15. The lower adhesive fixation layer 7B contains and integrally anchors the lower end of the bundle of hollow fiber membranes 3, the cross plate 25B, and the insertion rod 26B together. Moreover, a lower portion of the lower-end-side straightening cylinder 28 is integrally buried in the adhesive fixation layer 7B and fixed to an inner surface of the bottom portion 17.

The housing 5 is internally partitioned into three spaces by the upper adhesive fixation layer 7A and the lower adhesive fixation layer 7B. Of the three spaces, a space formed in the header cap 10 and a space formed in the bottom cap 11 correspond to the first area A1 in which the openings P at the ends of the hollow fiber membranes 2 are exposed. A space in the housing main body 9 formed between the lower adhesive fixation layer 7B and the upper adhesive fixation layer 7A corresponds to a second area A2 separated from the first area A1 by membrane walls of the hollow fiber membranes 2.

The hollow fiber membrane module 1 according to the present embodiment is assumed to perform external-pressure filtration. For example, the lower nozzle 21 is utilized as an introduction port for water to be treated to deliver the water to be treated into the second area A2 via the lower nozzle 21. Furthermore, the upper nozzle 19 is utilized for circulation of water to be treated or as a discharge port for concentrated water to be treated, to discharge, from the housing main body 9, the water to be treated passing through the second area A2. On the other hand, filtrate resulting from filtration performed by the hollow fiber membrane 2 passes through the first area A1 and is discharged through conduits 10a, 11a of the header cap 10 and the bottom cap 11.

Figure 7:
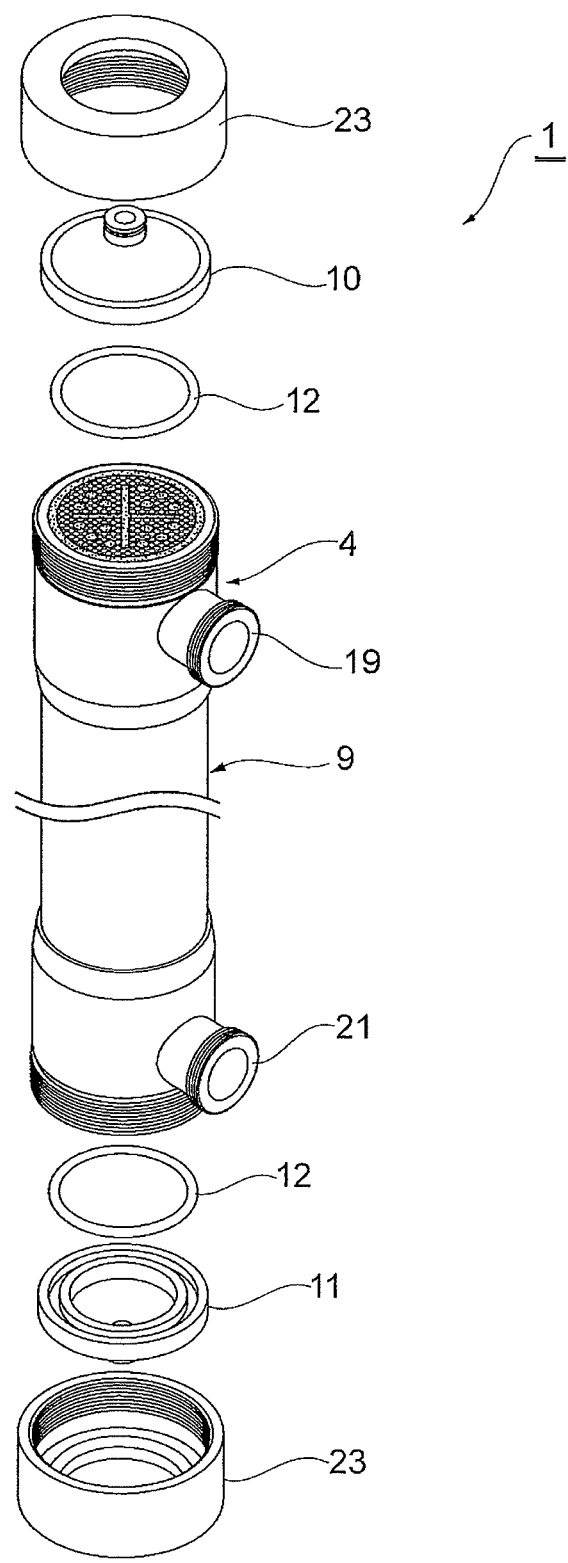
FIG. 7 is an exploded perspective view of the hollow fiber membrane module.

Now, a method for manufacturing a hollow fiber membrane module according to the present embodiment will be described with reference to FIG. 6 and FIG. 7. FIG. 6 is an exploded perspective view of a module preassembly prepared in order to manufacture the hollow fiber membrane module. FIG. 7 is an exploded perspective view of the hollow fiber membrane module.

A module preassembly 50 comprises an adhesive fixation layer formation container 51 used to form a housing main body 9. The adhesive fixation layer formation container 51 comprises a cylindrical main body container 51a, an upper container (hereinafter referred to as a "header container") 51b fixed to an upper portion of the main body container 51a in a liquid-tight manner, and a lower container (hereinafter referred to as a "bottom container") 51c fixed to a lower portion of the main body container 51a in a liquid-tight manner. The header container 51b is provided with the upper nozzle 19. The bottom container 51c is provided with the lower nozzle 21. The header container 51b is adhesively fixed to an upper end of the main body container 51a in a liquid-tight manner with an upper-end-side straightening cylinder (hereinafter referred to as an "upper straightening cylinder") 27 housed in the header container 51b. The bottom container 51c is adhesively fixed to a lower end of the main body container 51a in a liquid-tight manner with a lower-end-side straightening cylinder (hereinafter referred to as a "lower straightening cylinder") 28 housed in the bottom container 51c.

The bundle of hollow fiber membranes 3 is formed by bundling a plurality of hollow fiber membranes 2. Insertion components 53 and insertion components 54 are inserted in each of the opposite ends of the bundle of hollow fiber membranes 3. The insertion components 53 are X-shaped in cross section, and the insertion components 54 are shaped like rods and also has a function to correct a bias of the density distribution of the a plurality of hollow fiber membranes 2. The insertion components 53, 54 inserted in the upper end and the lower end are cut at a predetermined position, and as a result, serve as the cross plates 25A, 25B and the insertion rods 26A, 26B when a hollow fiber membrane element 4 is manufactured.

A net-like contact prevention member 29 is wound around an outer periphery of the bundle of hollow fiber membranes 3. The bundle of hollow fiber membranes 3 with the contact prevention member 29 wound around the bundle of hollow fiber membranes 3 is inserted into the adhesive fixation layer formation container 51. Moreover, after the insertion components 53, 54 are inserted into the opposite ends, P caps 55 are applied to the respective opposite ends of the adhesive fixation layer formation container 51. The opposite ends of the bundle of hollow fiber membranes 3 are brought into abutting contact with the respective P caps 55 to set the module preassembly 50.

A hole (adhesive injection port) 55a through which an adhesive is injected is formed in each of the P caps 55. A predetermined adhesive is injected through the adhesive injection port 55a to form an adhesive layer. The adhesive layers are cut at a predetermined position and serve as the adhesive fixation layers 7A, 7B when the hollow fiber membrane element 4 is manufactured.

Injection and hardening of the adhesive may be performed using what is called a centrifugal adhesion method utilizing a centrifugal force or what is called a stationary adhesion method of forcibly injecting and hardening the adhesive in a stationary state. The centrifugal adhesion method is more preferable because, when the adhesive fixation layers 7A, 7B are formed, a coating layer on an outer surface of the hollow fiber membranes 2 opposite to an inner surface of the adhesive fixation layers 7A, 7B can be made even, making membrane breakdown unlikely to occur. For the centrifugal adhesion method, rotation of the module preassembly placed level with the nozzles up is performed as a conventional method. Furthermore, for the centrifugal adhesion method, it is preferable to stop the rotation when hardening reaction progresses to the degree that the adhesive is no longer fluidized and then to heat the module preassembly in an oven or the like to complete the reaction in a practical hardened state.

An interface of the adhesive layer formed on the header container 51b side is formed near the upper nozzle 19 at a position where the interface does not enter an inside opening 19a of the upper nozzle 19. Furthermore, an interface of the adhesive layer formed on the bottom container 51c side is formed near the lower nozzle 21 at a position where the interface does not enter an inside opening 21a of the lower nozzle 21. The interface of the adhesive layer formed on the header container 51b side serves as a lower end surface 74 of the adhesive fixation layer 7A when the hollow fiber membrane element 4 is manufactured. Furthermore, the interface of the adhesive layer formed on the bottom container 51c side serves as an upper end surface 72 of the adhesive fixation layer 7B when the hollow fiber membrane element 4 is manufactured.

In the present embodiment, the example has been described in which the header container 51b and the P cap 55 are configured as separate components and in which the bottom container 51c and the P cap 55 are configured as separate components. However, the bottom container and the P cap portion (end container portion) or the header container and the P cap portion (end container) may be shaped like an integrally formed container. Furthermore, an adhesive injection port may be provided in the end container portion so that the adhesive can be injected through the injection port, or the adhesive may be injected directly through an opening end located close to the center of the bundle of hollow fiber membranes in the bottom portion or the header portion. Alternatively, the adhesive can be injected directly through a nozzle provided in the bottom container or the header container.

The adhesive is hardened. Then, the ends of the bundle of hollow fiber membranes 3, the insertion components 53, 54, and the straightening cylinders 27, 28 are integrated together and further fixed to an inner surface of the adhesive fixation layer formation container 51 via the adhesive layers to form the module preassembly 50. Subsequently, opposite ends of the module preassembly 50 are partly cut at predetermined positions to form openings P at ends of each of the hollow fiber membranes 2, thus completing the hollow fiber membrane element 4.

In the present embodiment, the aspect has been described in which the adhesive layers are anchored to the adhesive fixation layer formation container 51 to provide the housing main body 9 without any change. However, for example, for a hollow fiber membrane element for a cartridge module, the adhesive fixation layer formation container 51 may be formed of a material which adheres only weakly to the hardened adhesive and has a releasable structure so that the adhesive fixation layer formation container 51 can be released and removed after the adhesive is hardened.

As depicted in FIG. 7, external threads on which the cap nuts 23 are fitted in a screwing manner are formed at opposite ends of the hollow fiber membrane element 4. The bottom cap 11 or header cap 10 that is to be connected to a line is installed at each of the opposite ends of the hollow fiber membrane element 4 via a seal member 12 such as an O ring and is fixedly fastened via the cap nut 23 to complete the hollow fiber membrane module 1. The hollow fiber membrane module 1 according to the present embodiment is used for external-pressure filtration in which particulates are captured using an outer surface skin layer. Furthermore, dead end filtration (full flow filtration) and cross flow filtration may be used as a filtration scheme.

Now, with reference to FIG. 8, an example of an aspect will be described in which the hollow fiber membrane module 1 according to the present embodiment is installed in a filtration apparatus 100 used to manufacture ultrapure water. Moreover, a filtration method using the hollow fiber membrane module 1 according to the present embodiment will be described. For the filtration apparatus 100 used to manufacture ultrapure water, a cross flow filtration scheme based on external-pressure filtration is assumed.

Figure 8:
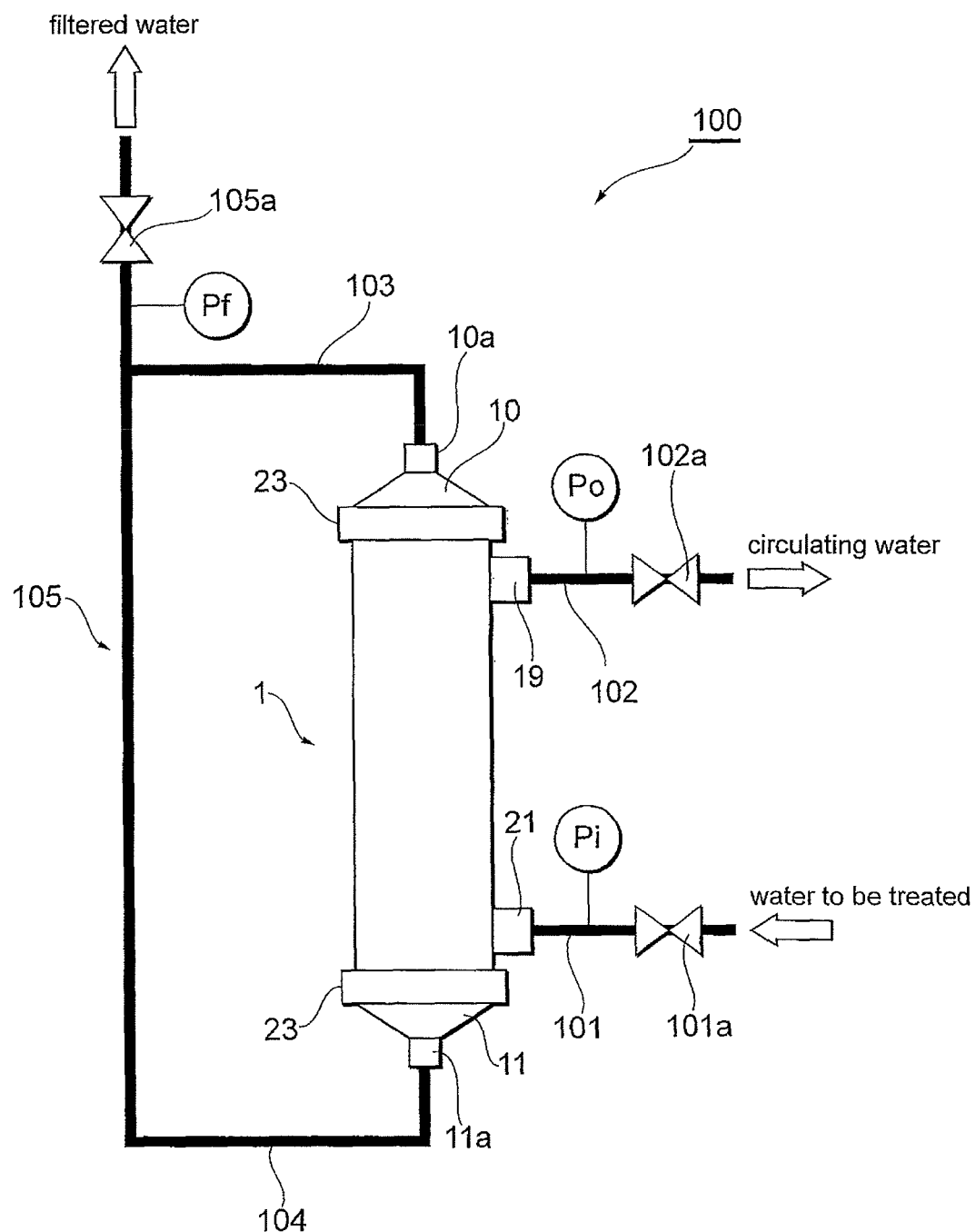
FIG. 8 is a diagram schematically depicting a filtration apparatus.

As depicted in FIG. 8, the filtration apparatus 100 is used, for example, as a final filter for ultrapure water. The filtration apparatus 100 feeds water to be treated from the lower nozzle 21 to the second area A2, located outside the hollow fiber membranes 2, filters and feeds the water to the inside (hollow portion) of the hollow fiber membranes 2, and discharges the filtrate (ultrapure water) from the first areas A1, corresponding to the opposite end sides of the bundle of hollow fiber membranes 3. Furthermore, circulating water (concentrated water) is discharged from the second area A2 through the upper nozzle 19.

The filtration apparatus 100 comprises a supply line 101 connected to the lower nozzle 21 of the hollow fiber membrane module 1 to supply the water to be treated, and a circulating line 102 connected to the upper nozzle 19 to feed the circulating water out. Moreover, a pressure gauge and various valves 101*a*, 102*a* and others are disposed in the middle of the supply line 101 and the circulating line 102. Furthermore, the filtration apparatus 100 comprises an upper filtrate collection pipe 103 and a lower filtrate collection pipe 104 which serve as channels for the filtrate. The upper filtrate collection pipe 103 and the lower filtrate collection pipe 104 are connected to a junction pipe 105 for the filtrate. The junction pipe 105 communicates with an external line (not depicted in the drawings). A pressure gauge and various valves 105*a* and others are disposed in the junction pipe 105.

The hollow fiber membrane module 1 is disposed in the vertical direction so that the upper nozzle 19 side in which the upper straightening cylinder 27 is housed lies upward. The upper nozzle 19 is connected to the circulating line 102. Furthermore, the conduit 10*a* of the header cap 10 is connected to the upper filtrate collection pipe 103. Additionally, the lower nozzle 21 is connected to the supply line 101. The conduit 11*a* of the bottom cap 11 is connected to the lower filtrate collection pipe 104.

The water to be treated such as ultrapure water is introduced from the supply line 101 into the second area (primary side area) A2 of the hollow fiber membrane module 1 through the lower nozzle 21 under a predetermined pressure. In the housing main body 9, most of the introduced water to be treated is filtered by the hollow fiber membranes 2, reaches the hollow portion, and moves upward or downward as filtrate. The filtrate having moved upward or downward flows through the openings P at the ends of the hollow fiber membranes 2 into the first area (secondary side area) A1 in the header cap 10 or the bottom cap 11. The filtrate is then discharged to the junction pipe 105 through the conduit 10*a*, 11*a*, the upper filtrate collection pipe 103, or the lower filtrate collection pipe 104, and sampled through the external line. On the other hand, water to be treated rising through the second area A2 in the housing main body 9 without passing through the hollow fiber membranes 2 is discharged through the upper nozzle 19 as circulating water and fed into the circulating line 102.

The above-described filtration method allows filtrate with a preferable quality to be obtained stably over a long period of time without breaking the hollow fiber membranes 2. Furthermore, it is preferable to perform a filtration operation while allowing approximately 2 to 5% of the amount of water supplied to flow out through the upper nozzle 19 as circulating water. This allows particulates and the like removed by the hollow fiber membranes 2 to be discharged out from the hollow fiber membrane module 1. Thus, a membrane surface is unlikely to be blocked to allow a stable amount of filtrate to be obtained over a longer period of time.

Now, a configuration of the adhesive fixation layers 7A, 7B at the lower end and upper end of the hollow fiber membrane module 1 according to the present embodiment will be described in further detail.

As depicted in FIG. 2, the upper adhesive fixation layer 7A comprises an upper end surface (outer end surface) 73 that is flush with an end surface of the bundle of hollow fiber membranes 3 in which the openings P communicating with the inside of the hollow fiber membranes 2 are exposed, and a lower end surface (inner end surface) 74 formed in the upper straightening cylinder 27. An upper portion of the upper straightening cylinder 27 is fixed to the adhesive fixation layer 7A. The cross plates 25A and the insertion rods 26A are contained in the adhesive fixation layer 7A.

Moreover, the cross plates 25A and the insertion rods 26A, contained in the upper adhesive fixation layer 7A, extend along the longitudinal direction of the bundle of hollow fiber membranes 3. The cross plates 25A and the insertion rods 26A comprise upper ends (outer ends) 25*s* and 26*s* that are flush with the upper end surface 73 of the adhesive fixation layer 7A and lower ends (inner ends) 25*t* and 26*t* disposed in the adhesive fixation layer 7A.

As depicted in FIG. 3, the lower adhesive fixation layer 7B comprises a lower end surface (outer end surface) 71 that is flush with an end surface of the bundle of hollow fiber membranes 3 and an upper end surface (inner end surface) 72 formed in the lower straightening cylinder 28. A lower portion of the lower straightening cylinder 28 is fixed to the adhesive fixation layer 7B. The cross plates 25B and the insertion rods 26B are contained in the adhesive fixation layer 7B.

Moreover, the cross plates 25B and the insertion rods 26B, contained in the lower adhesive fixation layer 7B, extend along the longitudinal direction of the bundle of hollow fiber membranes 3. The cross plates 25B and the insertion rods 26B comprise lower ends (outer ends) 25*k* and 26*k* that are flush with the lower end surface 71 of the adhesive fixation layer 7B and upper ends (inner ends) 25*m* and 26*m* disposed in the adhesive fixation layer 7B.

In the present embodiment, the height of the bias regulating members (cross plates 25A, 25B and insertion rods 26A, 26B) (the height corresponds to the lengths $L_1$, $L_2$, $L_3$, $L_4$ of the bias regulating members in the longitudinal direction of the bundle of hollow fiber membranes 3) is formed such that a value resulting from division of the height of the bias regulating members (cross plates 25A, 25B and insertion rods 26A, 26B) (the height corresponds to the lengths $L_1$, $L_2$, $L_3$, $L_4$ of the bias regulating members in the longitudinal direction of the bundle of hollow fiber membranes 3) by the thickness of the adhesive fixation layers 7A, 7B (the thickness corresponds to $L_A$, $L_B$), in other words, the bias regulating member height/adhesive fixation layer thickness is within the range of at least 0.5 and less than 0.8. The cross plates 25A, 25B are an example of a plate-lie bias regulating member, and the insertion rods 26A, 26B are an example of a rod-like bias regulating member.

Now, the evenness of the density distribution of the hollow fiber membranes 2 in the adhesive fixation layers 7A, 7B will be described. On the outer end surface 73 side of the adhesive fixation layer 7A (see FIG. 2), spaces are formed among the hollow fiber membranes 2 as a result of the disposition of the cross plates 25A and the insertion rods 26A. At least some of the spaces are each at least three times as large as the outer diameter of the hollow fiber membrane 2. As a result, in areas where the cross plates 25A and the insertion rods 26A are not disposed, the hollow fiber membranes 2 are densely assembled to allow unevenness of the density distribution of the hollow fiber membranes 2 to be corrected. On the other hand, on the inner end surface 74 of the adhesive fixation layer 7A, the spaces between the hollow fiber membranes 2 and a space from the hollow fiber membranes 2 to the upper straightening cylinder 27 are all less than three times as large as the outer diameter of the hollow fiber membrane 2. Thus, the spaces between the hollow fiber membranes 2 and the space from the hollow fiber membranes 2 to the upper straightening cylinder 27 are made equal to allow the unevenness of the density distribution of the hollow fiber membranes 2 to be corrected. As a result, the hollow fiber membranes 2 can be effectively restrained from being broken at root portions of the membrane 2 by water flowing in between the bundle of hollow fiber membranes 3 and the upper straightening cylinder 27 at the inner end surface 74.

Furthermore, on the outer end surface 71 side of the adhesive fixation layer 7B, spaces are formed among the hollow fiber membranes 2 as a result of the disposition of the cross plates 25B and the insertion rods 26B. At least some of the spaces are each at least three times as large as the outer diameter of the hollow fiber membrane 2. As a result, in areas where the cross plates 25B and the insertion rods 26B are not disposed, the hollow fiber membranes 2 are densely assembled to allow unevenness of the density distribution of the hollow fiber membranes 2 to be corrected. On the other hand, on the inner end surface 72 of the adhesive fixation layer 7B, the spaces between the hollow fiber membranes 2 and a space from the hollow fiber membranes 2 to the lower straightening cylinder 28 are all less than three times as large as the outer diameter of the hollow fiber membrane 2. Thus, the spaces between the hollow fiber membranes 2 and the space from hollow fiber membranes 2 to the lower straightening cylinder 28 are made equal to allow the unevenness of the density distribution of the hollow fiber membranes 2 to be corrected. As a result, the hollow fiber membranes 2 can be effectively restrained from being broken at the root portions of the membranes by water flowing in between the bundle of hollow fiber membranes 3 and the lower straightening cylinder 28 at the inner end surface 72.

In the present embodiment, the width of the cross plates 25A, 25B and insertion rods 26A, 26B is at least three times as large as the outer diameter of the hollow fiber membrane 2. Thus, it is possible to determine, without the need for actual observations, that at least some of the spaces between the hollow fiber membranes 2 on the outer end surfaces 73, 71 of the adhesive fixation layers 7A, 7B are at least three times as large as the outer diameter of the hollow fiber membrane 2. On the other hand, if direct estimation based on, for example, the width of the bias regulating members such as the cross plates 25A, 25B and the insertion rods 26A, 26B is impossible, the determination may be made by observing the outer end surfaces 73, 71 of the adhesive fixation layers 7A, 7B and actually measuring the dimensions. In this case, the outer diameter of the hollow fiber membrane 2 may be determined from the average outer diameter of a plurality of the hollow fiber membranes 2.

Furthermore, determination of whether or not the spaces between the hollow fiber membranes 2 and the space from the hollow fiber membranes 2 to each straightening cylinder 27, 28 are all less than three times as large as the outer diameter of the hollow fiber membrane 2 on the inner end surfaces 74, 72 of the adhesive fixation layers 7A, 7B, the determination may be made by observing the inner end surfaces 74, 72 of the adhesive fixation layers 7A, 7B and actually measuring the dimensions. In this case, the outer diameter of the hollow fiber membrane 2 may be determined from the average outer diameter of a plurality of the hollow fiber membranes 2.

Additionally, in the present embodiment, since a plurality of types of bias regulating members with different shapes, specifically, the cross plates 25A, 25B and the insertion rods 26A, 26B, are used, the spaces between the hollow fiber membranes 2 on the outer end surfaces 73, 71 and the inner end surface 74, 72 may be easily adjusted. As a result, it is easy to set some of the spaces between the hollow fiber membranes 2 formed as a result of disposition of the cross plates 25A and the insertion rods 26A to be at least three times as large as the outer diameter of the hollow fiber membrane 2 on the outer end surfaces 73, 71. In addition, it is easy to set the spaces between the hollow fiber membranes 2 and the space from the hollow fiber membranes 2 to the upper straightening cylinder 27 to be all less than three times as large as the outer diameter of the hollow fiber membrane 2 on the inner end surfaces 74, 72.

As described above, the bias of the density distribution of the hollow fiber membranes 2 can be reduced. The present embodiment makes further improvement in order to, for example, correct the unevenness of the density distribution of the hollow fiber membranes 2. The contents of the improvement will be described below.

As described above, on the outer end surface 73 side of the opposite end surfaces 73, 74 of the upper adhesive fixation layer 7A where the hollow fiber membranes 2 are open, the hollow fiber membranes 2 pushed away by the cross plates 25A and the insertion rods 26A are densely assembled to allow the unevenness of the density distribution of the hollow fiber membranes 2 to be corrected. Moreover, the cross plates 25A and the insertion rods 26A are disposed in the adhesive fixation layer 7A so that a value resulting from division of the height of the cross plates 25A and the insertion rods 26A by the thickness of the adhesive fixation layer 7A is at least 0.5 and less than 0.8. As a result, on the inner end surface 74 side (the root portion side of the hollow fiber membranes 2) opposite to the outer end surface 73 of the adhesive fixation layer 7A, the impact of the cross plates 25A and the insertion rods 26A is reduced. This prevents some of the spaces between the root portions of the hollow fiber membranes 2 from being locally widened, to make equal the spaces between the hollow fiber membranes 2 and the space from the hollow fiber membranes 2 to the upper straightening cylinder 27. Thus, the unevenness of the density distribution of the hollow fiber membranes 2 can be corrected. As a result, the hollow fiber membranes 2 can be effectively restrained from being broken at the root portions of the membranes 2 by water flowing in between the bundle of hollow fiber membranes 3 and the upper straightening cylinder 27 at the inner end surface 74.

Furthermore, in the present embodiment, when a value resulting from division of the height of the insertion rod 26A by the thickness of the adhesive fixation layer 7A is larger than a value resulting from division of the height of the cross plate 25A by the thickness of the adhesive fixation layer 7A, the bias of the density distribution of the hollow fiber membranes 2 can be more reliably reduced. More suitably, the value resulting from the division of the height of the cross plate 25A by the thickness of the adhesive fixation layer 7A is at least 0.5 and less than 0.7, and the value resulting from the division of the height of the insertion rod 26A by the thickness of the adhesive fixation layer 7A is at least 0.6 and less than 0.8. Here, the "thickness of the adhesive fixation layer" refers to the average thickness of the whole adhesive fixation layer. The height of the bias regulating members such as the cross plates and the insertion rods refers to a height resulting from number averaging executed on the members having a substantial impact on the control of the density distribution.

This also applies to the lower adhesive fixation layer 7B. On the outer end surface 71 side of the opposite end surfaces 71, 72 of the upper adhesive fixation layer 7B where the hollow fiber membranes 2 are open, the hollow fiber membranes 2 pushed away by the cross plates 25B (bias regulating members) and the insertion rods 26B (bias regulating members) are densely assembled to allow the unevenness of the density distribution of the hollow fiber membranes 2 to be corrected. Moreover, the cross plates 25B and the insertion rods 26B are disposed such that a value resulting from division of the height of the cross plates 25B and the insertion rods 26B by the thickness of the adhesive fixation layer 7B is at least 0.5 and less than 0.8. Thus, on the inner end surface 72 side (the root portion side of the hollow fiber membranes 2) opposite to the outer end surface 71 of the adhesive fixation layer 7B, the impact of the cross plates 25B and the insertion rods 26B is reduced. This consequently prevents some of the spaces between the root portions of the hollow fiber membranes 2 from being locally widened, to make equal the spaces between the hollow fiber membranes 2 and the space from the hollow fiber membranes 2 to the lower straightening cylinder 28. Hence, the unevenness of the density distribution of the hollow fiber membranes 2 can be corrected. As a result, the hollow fiber membranes 2 can be effectively restrained from being broken at the root portions of the membranes 2 by water flowing in between the bundle of hollow fiber membranes 3 and the lower straightening cylinder 28 at the inner end surface 72.

Furthermore, when a value resulting from division of the height of the insertion rod 26B by the thickness of the adhesive fixation layer 7B is larger than a value resulting from division of the height of the cross plate 25B by the thickness of the adhesive fixation layer 7B, the bias of the density distribution of the hollow fiber membranes 2 can be more reliably reduced. More suitably, the value resulting from the division of the height of the cross plate 25B by the thickness of the adhesive fixation layer 7B is at least 0.5 and less than 0.7, and the value resulting from the division of the height of the insertion rod 26B by the thickness of the adhesive fixation layer 7B is at least 0.6 and less than 0.8.

Figure 9A:
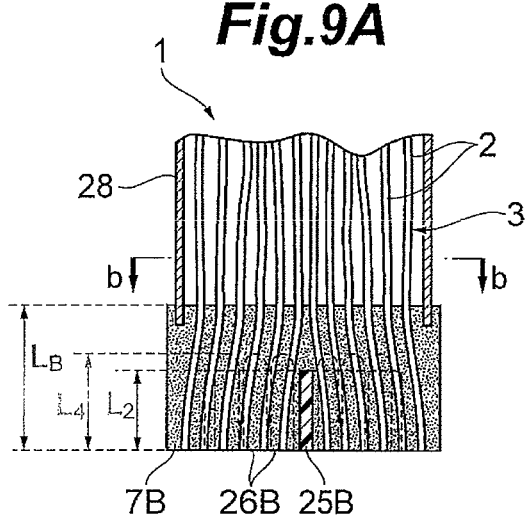
FIG. 9A is a vertical cross-sectional view depicting a lower portion of the hollow fiber membrane module according to the present embodiment.
Figure 9B:
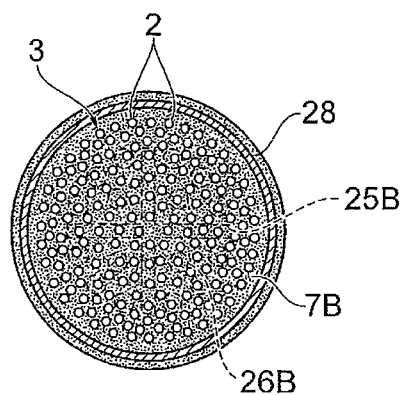
FIG. 9B is a cross-sectional view taken along line b-b in FIG. 9A.
Figure 9C:
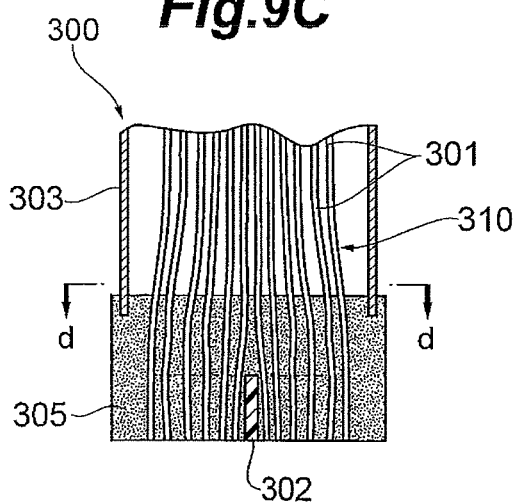
FIG. 9C is a vertical cross-sectional view depicting a lower portion of a hollow fiber membrane module according to Comparative Example 2.
Figure 9D:
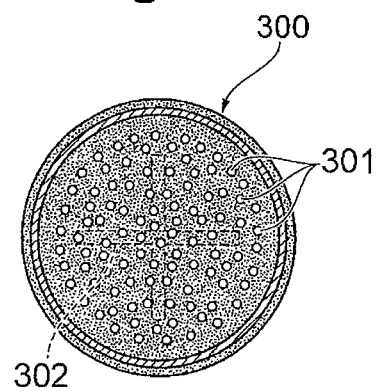
FIG. 9D is a cross-sectional view taken along line d-d in FIG. 9C.
Figure 9E:
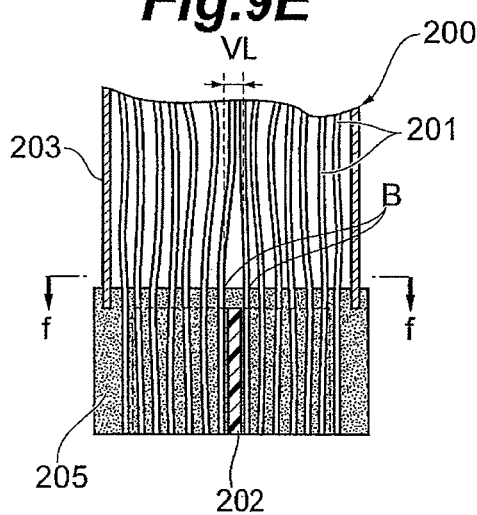
FIG. 9E is a vertical cross-sectional view depicting a lower portion of a hollow fiber membrane module according to Comparative Example 1.
Figure 9F:
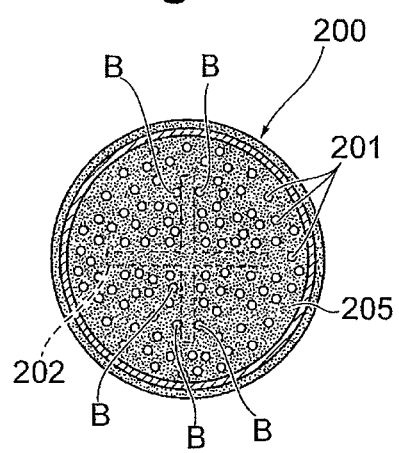
FIG. 9F is a cross-sectional view taken along line f-f in FIG. 9E.

As described above, the unevenness of the density distribution of the hollow fiber membranes 2 is corrected in the adhesive fixation layers 7A, 7B. Thus, a drift of the water to be treated is suppressed to effectively restrain the hollow fiber membranes 2 from being broken at the root portions thereof. As a result, the breakage is unlikely to occur even with an increase in filtration flow rate, enabling the life of the hollow fiber membrane module 1 to be extended. This effect will be described in detail with reference to FIGS. 9A to 9F. FIG. 9A is a vertical cross-sectional view schematically depicting the lower adhesive fixation layer 7B in the hollow fiber membrane module 1 according to the present embodiment. FIG. 9B is a schematic vertical cross-sectional view taken along line b-b in FIG. 9A. Furthermore, FIG. 9C is a vertical cross-sectional view schematically depicting a lower adhesive layer in a hollow fiber membrane module 300 according to Comparative Example 2. FIG. 9D is a schematic cross-sectional view taken along line d-d in FIG. 9C. Additionally, FIG. 9E is a vertical cross-sectional view schematically depicting a lower adhesive layer in a hollow fiber membrane module 200 according to Comparative Example 1. FIG. 9F is a schematic cross-sectional view taken along line f-f in FIG. 9E. In the description below, mostly the lower adhesive fixation layer will be described by way of example. However, matters related to the upper adhesive fixation layer may be described in association with the description of the lower adhesive fixation layer.

The inventors installed the hollow fiber membrane module 200 according to Comparative Example 1 (hereinafter referred to as a "comparative example 200") in a filtration apparatus used to manufacture ultrapure water and carried out a predetermined water treatment based on external-pressure filtration. The inventors then found that the hollow fiber membranes 201 were broken in a relatively short period of time. Thus, the inventors checked breakage points B to determine that, in an aspect in which the insertion components 202 (bias regulating members 25A, 25B) are inserted into the bundle of hollow fiber membranes, the breakage points B of hollow fiber membranes 201 do not occur irregularly but occur at the root portions of the hollow fiber membranes 201 projecting from the adhesive fixation layer 205 in a straightening cylinder 203 (see FIG. 9E). Moreover, the breakage points B are exactly points near a position immediately above (immediately below) a position where the plate-like insertion components 202 are disposed (see FIG. 9F).

Then, in order to determine the cause, the inventors checked the comparative example 200. The inventors then found that, in the comparative example 200, the insertion components 202 had a large length, so that upper ends of the insertion components reached the vicinity of an upper end surface (inner end surface) of the adhesive fixation layer 205, with the result that the distance between the root portion of each of the hollow fiber membranes 201 and each of the insertion components 202 was very short. Moreover, the inventors found that, due to the short distance, in the comparative example 200, the gap between the hollow fiber membranes 201 that were adjacent to each other across the insertion component 202 was not absorbed in the adhesive fixation layer 205 but appeared even at the root portions of the hollow fiber membranes 201, resulting in gaps VL of a low density of the hollow fiber membranes 201. Then, the inventors assumed that the water to be treated flowing into the straightening cylinder 203, where the external-pressure filtration is performed, a flow rate of water flowing through the gaps VL increases locally ratio, resulting in an uneven flow (drift) in the housing and that the hollow fiber membranes 201 are significantly deflected near the gap VL and overloaded so that breakage easily occurs when the filtration flow rate is increased.

Thus, due to finding of the above-described challenge, the inventors changed the perspectives. In a hollow fiber membrane module 300 according to Comparative Example 2 (hereinafter referred to as a "comparative example 300"), the inventors shortened the dimension of insertion components 302 as depicted in FIG. 9C and FIG. 9D to verify that the gap between hollow fiber membranes 301 adjacent to each other across the insertion component 302 is absorbed in an adhesive fixation layer 305 to prevent the gap between the adjacent hollow fiber membranes 301 from being formed to have a specific size or larger immediately above (or immediately below) a position where the plate-like insertion component 305 is disposed. The comparative example 300 was installed in a filtration apparatus used to manufacture ultrapure water, and a predetermined water treatment was executed based on external-pressure filtration. Then, compared to the comparative example 200, the comparative example 300 extended the life of the hollow fiber membranes. However, the inventors found that, although the hollow fiber membranes 301 were not broken immediately above (or immediately below) the insertion components 302, the breakage of the hollow fiber membranes 302 newly occurred concentrically at the root portions of the hollow fiber membranes 301 at an outer edge of the bundle of hollow fiber membranes 310 projecting from the adhesive fixation layer 305.

Then, the inventors assumed that, in the comparative example 300 with the dimension of the insertion components 302 reduced, even though the gap between the adjacent hollow fiber membranes 301 is not formed to have a specific size or larger immediately above (or immediately below) the insertion components 302, the gap between the bundle of hollow fiber membranes 310 and a straightening cylinder 303 has a specific size or larger and that the sizes of the gaps are uneven sizes, causing a drift in particularly large gap portions, with the result that the hollow fiber membranes 301 vibrate violently and are broken.

Based on the two Comparative Examples 1, 2, the inventors examined a structure of the hollow fiber membrane module which can solve both the challenge in which the gap between the hollow fiber membranes 201 adjacent to each other across the insertion component 202 is formed to have a specific size or larger (challenge for the comparative example 200) and the challenge in which gaps with uneven sizes each equal to or larger than a specific size are formed between the bundle of hollow fiber membranes 310 and the straightening cylinder 303 (challenge for the comparative example 300). As a result, the inventors have arrived at a hollow fiber membrane module that enables the life of the hollow fiber membranes to be further extended to provide ultrapure water with preferable quality over a long period of time.

In other words, the inventors have confirmed that, in the hollow fiber membrane module 1 according to the present embodiment, at least some of the spaces between the hollow fiber membranes 2 formed as a result of disposition of the cross plates 25A, 25B and the insertion rods 26A, 26B are each at least three times as large as the outer diameter of the hollow fiber membrane 2 on the outer end surfaces 73, 71 of the adhesive fixation layers 7A, 7B, and that the spaces between the hollow fiber membranes 2 and the space from the hollow fiber membranes 2 to the straightening cylinder 27 are all less than three times as large as the outer diameter of the hollow fiber membrane 2 on the inner end surfaces 74, 72 of the adhesive fixation layers 7A, 7B. As a result, the inventors have found that the above-described two challenges are solved to enable the life of the hollow fiber membranes to be further extended, providing ultrapure water with preferable quality over a long period of time.

An example of a configuration of the adhesive fixation layer allowing the spaces between the hollow fiber membranes 2 as described above to be achieved and the effects of the example will be described below. Specifically, when the bias regulating members (cross plates 25A, 25B and insertion rods 26A, 26B) are provided which are appropriately installed in the adhesive fixation layers 7A, 7B, and a value resulting from the division, by the thickness of the adhesive fixation layers 7A, 7B, of the height of the bias regulating members (cross plates 25A, 25B and insertion rods 26A, 26B) contained in the adhesive fixation layers 7A, 7B, in other words, the value of "bias regulating member height/adhesive fixation layer thickness", is within the range of at least 0.5 and less than 0.8, the above-described spaces between the hollow fiber membranes 2 can consequently be achieved, and this is preferable.

For example, when the value of "bias regulating member height/adhesive fixation layer thickness" is at least 0.8, gaps attributed to the bias regulating members 202 may be formed on the inner end surface of the adhesive fixation layer, and the spaces between the hollow fiber membranes 201 may each be at least three times as large as the outer diameter of the hollow fiber membrane 201 as illustrated in the comparative example 200 (see FIG. 9E, FIG. 9F). In other words, it is expected that, in the comparative example 200, gaps VL may be formed immediately above (or immediately below) the inner end surface due to the impact of the bias regulating members 202 and that a drift may occur in the gap portions. This leads to breakage of the hollow fiber membranes 2. On the other hand, when the value of "bias regulating member height/adhesive fixation layer thickness" is less than 0.5, no gap attributed to the bias regulating members 302 is formed on the inner end surface of the adhesive fixation layer. However, the space from the hollow fiber membranes 301 to the straightening cylinder 303 may be at least three times as large as the outer diameter of the hollow fiber membrane 301 (see FIG. 9C, FIG. 9D). In other words, it is expected that, in the comparative example 300, a drift may occur in the gap portions between each of the hollow fiber membranes 301 and the straightening cylinder 303. This leads to breakage of outer peripheral portions of the hollow fiber membranes 301 at the roots thereof. In other words, when the "bias regulating member height/adhesive fixation layer thickness" is at least 0.5 and less than 0.8, the above-described two challenges are solved to enable the life of the hollow fiber membranes to be further extended, providing ultrapure water with preferable quality over a long period of time.

Now, elements and variations of the hollow fiber membrane module 1 according to the present embodiment will be described in further detail.

(Hollow Fiber Membranes)

Examples of the hollow fiber membranes include reverse osmosis membranes, nano-filtration membranes, ultrafiltration membranes, and microfiltration membranes. Any of these membranes may be used according to the size of substances to be removed. In particular, when the hollow fiber membranes are used as a final filter for ultrapure water, it is preferable to use ultrafiltration membranes because particulates of several nm to several hundred nm are to be removed.

Examples of a material for the hollow fiber membranes include, without particular limitation, polysulfone, polyether sulfone, polyphenyl sulfone, polyether sulfone, polyacrylonitrile, polyimide, polyetherimide, polyamide, polyether ketone, polyether ether ketone, polyethylene, polypropylene, poly(4-methylpenten), an ethylene-vinyl alcohol copolymer, cellulose, cellulose acetate, polyvinylidene fluoride, an ethylene-tetrafluoroethylene copolymer, and polytetrafluoroethylene, etc. Furthermore, a composite material of these materials may be used. In particular, for an ultrapure water application for which water quality standards for ion components and organic components are strict, it is preferable to use a polysulfone resin such as polysulfone, polyether sulfone, or polyphenyl sulfone as a material for the hollow fiber membranes which is unlikely to be eluted.

Furthermore, for the shape of the hollow fiber membranes, membranes having an inner diameter of preferably 200 μm to 2000 μm and more preferably 500 μm to 1500 μm and for which the ratio of the inner diameter to the outer diameter (inner diameter/outer diameter ratio) is 03 to 0.8 is suitably used.

In particular, a high filtration capability is preferable, and it is preferable to use hollow fiber membranes with a filtration capability of 0.8 mL/min/cm$^2$ at 0.1 MPa and at least 25° C. in order to increase a filtration speed. A material with a high burst strength and a high compression strength and a pressure resistance of at least 0.5 MPa is preferable.

Moreover, when the area occupied by the hollow fiber membranes on the inner end surface with respect to the area of the inner end surface in the straightening cylinder (upper straightening cylinder 27, lower straightening cylinder 28), what is called filling rate, is at least 40% and less than 85%, the effects of the hollow fiber membrane module 1 are more appropriately exerted. When the filling rate is less than 40%, the membrane area per module is small, and thus, the filtration flow rate is low. This is not preferable. Furthermore, when the filling rate is at least 85%, the diameter of the bundle of hollow fiber membranes is large, and thus, a problem may occur such as damage to the hollow fiber membranes at the time of insertion of the hollow fiber membranes into the housing. It is preferable that the filling rate be at least 50% and less than 70% in order to achieve a high filtration flow rate and durability.

(Bias Regulating Members)

In the above-described embodiment, the bias regulating members comprising the cross plates 25A, 25B and the insertion rods 26A, 26B are illustrated. However, for the bias regulating members, the shape is originally not particularly limited, and the cross-sectional shape may be a circle or an ellipse, or a polygon such as a rectangle or a hexagon, or a star shape, a plate shape, or a rod shape. Furthermore, such members may be combined together for use. As in the above-described embodiment, a combination of the flat plate-shaped cross plates 25A, 25B and the rod-shaped insertion rods 26A, 26B for use allows the density distribution of the hollow fiber membranes to be easily and suitably made even on the inner end surface of the adhesive fixation layer.

Additionally, it is preferable that the thickness of the bias regulating members be at least three and at most 20 times as large as the outer diameter of the hollow fiber membranes in view of the easiness with which the distribution of the hollow fiber membranes is controlled. In particular, when the thickness of the bias regulating members is at least three times as large as the outer diameter of the hollow fiber membranes, the spaces between the hollow fiber membranes formed as a result of disposition of the bias regulating members on the outer end surface of the adhesive fixation layer can be reliably set at least three times as large as the outer diameter of the hollow fiber membranes. The "thickness" as used herein means the equivalent circle diameter of a part of the bias regulating members which has the largest cross-sectional area in a length direction. In addition, the outer diameter of the hollow fiber membranes is typically 0.6 mm to 2.5 mm, and thus specifically, the range of 1.8 mm to 50 mm is particularly preferably used. It is suitable to taper a tip portion of the bias regulating members, specifically, the tip portion of the bias regulating members which corresponds to the inner end surface side when the bias regulating members are placed in the adhesive fixation layer, for example, to shape the tip portion like a cone. Tapering the tip portion of the bias regulating members allows the bias regulating members to be easily inserted into the bundle of hollow fiber membranes 3. When the tip portion is tapered, the degree of the taper may be a taper ratio of 1/70 to 1/1. Furthermore, when the bias regulating members are tapered, the taper may cover only the tip portion or the whole bias regulating members. The bias regulating members tapered on the inner end surface side are not limited to the rod-like bias regulating members but include plate-like bias regulating members.

As a material for the bias regulating members, polymer materials, inorganic materials, and the like may be widely used without particular limitation. However, a material is used which is compatible with the adhesive providing the adhesive fixation layer and which is thus expected to exert a sufficient adhesion effect and which has a modulus of tensile elasticity equivalent to or higher than the modulus of tensile elasticity of the adhesive. In particular, when the hollow fiber membrane module is used for an ultrapure water application, it is preferable to use an organic polymer material that elutes few ions.

For the amount of the bias regulating members inserted, it is preferable that the rate of the occupied volume of the bias regulating members in the adhesive fixation layer with respect to the occupied volume of the hollow fiber membranes in the adhesive fixation layer be at least 5% and at most 20% in view of prevention of the bias of the hollow fiber membranes. It is more preferable that the rate is at least 10% and at most 18% in order to achieve both a large amount of filtration and durability. However, it is preferable to adjust the value resulting from the division of the height of the bias regulating members by the thickness of the adhesive fixation layer to at least 0.5 and less than 0.8.

(Straightening Cylinder)

For the straightening cylinder (straightening plate), the shape is not particularly limited provided that the bundle of hollow fiber membranes can be restrained from being vibrated at the end thereof by the water to be treated flowing into the bundle of hollow fiber membranes. However, for a membrane module with a cylindrical housing, a cylindrical shape is generally used.

Moreover, it is preferable that the value of the ratio between the height h of the straightening cylinder from the inner end surface of the adhesive fixation layer and the inner diameter d of the straightening cylinder be at least 0.7 and less than 1.1. When this value is less than 0.7, if the hollow fiber membrane module is used for the external-pressure filtration scheme in which the water to be treated is supplied through the lower nozzle, the height of the straightening cylinder is insufficient, precluding the bundle of hollow fiber membranes from being sufficiently protected from an impact when the water to be treated flows into the bundle of hollow fiber membranes. On the other hand, when this value is at least 1.1, the bundle of hollow fiber membranes can be sufficiently protected from an impact when the water to be treated flows in through the lower nozzle, but the flow of water flowing beyond the straightening cylinder into the side of the bundle of hollow fiber membranes becomes extremely large. As a result, the hollow fiber membranes are significantly deflected and are thus likely to be broken.

(Contact Prevention Member)

Examples of a material for the net-like contact prevention member covering the bundle of hollow fiber membranes include, without particular limitation, polysulfone, polyether sulfone, polyacrylonitrile, polyimide, polyetherimide, polyamide, polyether ketone, polyether ether ketone, polyethylene, polypropylene, poly(4-methylpenten), an ethylene-vinyl alcohol copolymer, cellulose, cellulose acetate, polyvinylidene fluoride, an ethylene-tetrafluoroethylene copolymer, polytetrafluoroethylene, a tetrafluoroethylene perfluoroalkylvinylether copolymer, etc. Furthermore, a composite material of these materials may be used.

In view of installation on the bundle of hollow fiber membranes, it is preferable that the contact prevention member be polyamide, polyethylene, polypropylene, polyvinylidene fluoride, an ethylene-tetrafluoroethylene copolymer, polytetrafluoroethylene, a tetrafluoroethylene perfluoroalkylvinylether copolymer, or the like. Furthermore, it is preferable that the wire diameter of the material forming the net be at least 0.2 mm and at most 2 mm. When the wire diameter is less than 0.2 mm, a sufficient contact prevention effect is not expected to be exerted. When the wire diameter is more than 2 mm, the net is rigid, and the contact prevention member itself damages the hollow fiber membranes.

(Adhesive Fixation Layer)

The adhesive fixation layer is formed by injection and hardening of a predetermined adhesive. It is preferable that the adhesive be a polymer material such as an epoxy resin, a urethane resin, an epoxy acrylate resin, or a silicon resin. In particular, when the adhesive fixation layer is used for an ultrapure water application, the epoxy resin, which has few elusion components, is particularly preferable because it is not preferable that ion components or organic components attributed to the adhesive fixation layer elute into the filtrate.

EXAMPLES

In examples and comparative examples below, polysulfone ultrafiltration membranes and a module case were used as hollow fiber membranes. The characteristics of the polysulfone ultrafiltration membranes and the module case are illustrated below.

[Polysulfone Ultrafiltration Membranes]

Inner diameter/outer diameter: 0.6 mm/1.0 mm, outer surface area-equivalent amount of transmitted water: 500 L/m²/hr (measured value at an effective membrane length of 5 cm), tensile strength: 5.5 MPa, and tensile elongation: 80%.

The outer surface area-equivalent amount of water permeating the hollow fiber membranes is a value expressed as the amount of filtrate obtained at a unit area (outer surface area) and a unit time when pure water of 25° C. resulting from filtration through RO membranes is filtered at a pressure of 0.1 MPa using hollow fiber membranes with an effective length of 50 mm. Furthermore, the rupture strength and rupture elongation of the hollow fiber membranes were measured at an effective sample length of 30 mm and a tension speed of 50 mm/min using Autograph AGS-5D manufactured by Shimadzu Corporation.

The tensile strength (MPa) is a value calculated by dividing a load imposed on one hollow fiber membrane at the time of rupture by the cross-sectional area of the membrane in a state before tension is applied to the membrane. The tensile elongation (%) is the ratio of the amount by which the membrane is elongated before rupture to the original length of the membrane.

[Housing Size Used for the Hollow Fiber Membrane Module]

As a cylindrical case, a cylindrical housing of polysulfone specified as follows was used. The inner diameter/outer diameter of the cylindrical portion in the filtration area: 154 mm/170 mm, the inner diameter/outer diameter of the nozzle portion: 162 mm/183 mm, the inner diameter of the nozzle: 58 mm, the length of the cylindrical case/center distance of the nozzle: 1050 mm/872 mm.

[Filtration Evaluation Method and Leak Check Method]

The filtration apparatus depicted in FIG. 8 was used and operated in accordance with external-pressure filtration. Before evaluation was made, a leak check was conducted as follows. That is, line connection caps at the opposite ends of the filtration apparatus were removed, and then, the module was immersed in a water tank and thus internally filled with pure water. Then, a stopper was placed on one of the nozzles to bring the nozzle into a closed state, and a compressed air line was connected to the other nozzle. Air pressure was gradually applied until the pressure reached 0.1 MPa. The opposite ends of the module were observed and whether or not a continuous outflow of air bubbles from the hollow portions of the hollow fiber membranes was present was checked. When a continuous outflow of air bubbles was present, the module was determined to suffer leakage.

Example 1

A filtration operation was performed using a hollow fiber membrane module constructed by covering 11600 hollow fiber membranes of polysulfone with a polyethylene net with a wire diameter of 0.5 mm as a contact prevention member, placing the hollow fiber membranes covered with the net in a polysulfone housing, and fixing the housing at the opposite ends thereof with an epoxy resin.

Cross shapes (cross plates) of height 70 mm, width 138 mm, and thickness 5 mm and cylindrical insertion rods of height 75 mm and diameter 10 mm were inserted into each of the ends of the bundle of hollow fiber membranes as bias regulating members using the same epoxy resin as that used to form the adhesive fixation layers. Furthermore, the cross plates were placed in each of the adhesive fixation layers so as to avoid facing the lower nozzle or the upper nozzle. The separation distance between the cross plates and the straightening cylinder was 22 mm. The height of the cross plates in the adhesive layer was 23 mm. The distance from the inner end surface of the adhesive fixation layer to the cross plates was 28 mm. Furthermore, as the straightening cylinder, a cylindrical component of inner diameter 140 mm and height 135 mm was used.

The hollow fiber membrane module was attached to a predetermined line to the filtration apparatus, and ultrapure water was filtered as untreated water. As the ultrapure water, water was used which was manufactured by treating river water using microfiltration membranes and using reverse osmosis membranes and an ion exchange resin, and also executing a UV sterilization treatment on the treated water and which had quality indicated by a specific resistance value of 18.1 MΩ·cm and containment of 20000 particulates of at least 0.1 μm per litter.

At this time, the flow rate of water to be treated supplied to the hollow fiber membrane module was set to 25 m³/h by adjusting the opening degree of the pump outlet valve. Of the flow rate, the amount of filtrate was 24.5 m³/h, and the amount of concentrated water was 0.5 m³/h.

Two months after the start of operation, the number of particulates of at least 0.1 μm in the filtrate was measured. Then, the number was 0 pcs/L. At that point in time, operation was stopped, and a leak check was conducted under an external pressure using air (the pressure was maintained at 0.1 MPa for two minutes). No air leakage from the cut end surface of the module was observed.

The module was disassembled, and the hollow fiber membranes were removed. For evaluation of the performance of the hollow fiber membranes, the outer surface-equivalent amount of transmitted water was measured. Then, the amount was 490 L/m²/hr, indicating substantially no change. Furthermore, the bundle of hollow fiber membranes near the inner end surface of the adhesive fixation layer was removed, and the inner end surface was observed. Then, no gap three times as large as the outer diameter of the hollow fiber membranes was identified in the bundle of hollow fiber membranes or between the bundle of hollow fiber membranes and the straightening cylinder.

Furthermore, the adhesive fixation layer was divided into halves along the longitudinal direction of the hollow fiber membranes, and the thickness of the adhesive fixation layer and the length of the bias regulating members were measured. Then, the thickness of the adhesive fixation layer was 55 mm. The height of the cross plates in the adhesive fixation layer was 30 mm. The height of the insertion rods in the adhesive fixation layer was 35 mm. Thus, when the bias regulating member height/adhesive fixation layer thickness was calculated, 30/55=0.55 for the cross plates, and 35/55=0.64 for the insertion rods. Additionally, the height from the inner end surface of the adhesive fixation layer was 125 mm. The ratio of the height to the inner diameter of the straightening cylinder, 140 mm, was 0.89.

Example 2

A hollow fiber membrane module was produced and a filtration operation was performed as is the case with the first example except that, as the straightening cylinder, a cylindrical component of inner diameter 140 mm and height 185 mm was used.

Two months after the start of operation, the number of particulates of at least 0.1 μm in the filtrate was measured. Then, the number was 70 pcs/L. At that point in time, operation was stopped, and a leak check was conducted under an external pressure using air (the pressure was maintained at 0.1 MPa for two minutes). As a result of the leak check, air leakage from the cut end surface of the module was observed but only at two points.

The module was disassembled, and the hollow fiber membranes were removed. For evaluation of the performance of the hollow fiber membranes, the outer surface-equivalent amount of transmitted water was measured. Then, the amount was 490 L/m²/hr, indicating substantially no change. Furthermore, the bundle of hollow fiber membranes near the inner end surface of the adhesive fixation layer was removed, and the inner end surface was observed. Then, no gap three times as large as the outer diameter of the hollow fiber membranes was identified in the bundle of hollow fiber membranes or between the bundle of hollow fiber membranes and the straightening cylinder.

Furthermore, the adhesive fixation layer was divided into halves along the longitudinal direction of the hollow fiber membranes, and the thickness of the adhesive fixation layer and the length of the bias regulating members were measured. Then, the thickness of the adhesive fixation layer was 55 mm. The height of the cross plates in the adhesive fixation layer was 30 mm. The height of the insertion rods in the adhesive fixation layer was 35 mm. Thus, when the bias regulating member height/adhesive fixation layer thickness was calculated, 30/55=0.55 for the cross plates, and 35/55=0.64 for the insertion rods. Additionally, the height of the adhesive fixation layer from the inner end surface was 125 mm. The ratio of the height to the inner diameter of the straightening cylinder, 140 mm, was 0.89. In addition, the height from the inner end surface of the adhesive fixation layer was 175 mm, and the ratio of the height to the inner diameter of the straightening cylinder was 1.25.

Example 3

A hollow fiber membrane module was produced and a filtration operation was performed as is the case with the first example except that, as the bias regulating member, cross shapes (cross plates) of height 78 mm, width 138 mm, and thickness 5 mm and cylindrical insertion rods of height 83 mm and diameter 10 mm were used.

Two months after the start of operation, the number of particulates of at least 0.1 μm in the filtrate was measured. Then, the number was 100 pcs/L. At that point in time, operation was stopped, and a leak check was conducted under an external pressure using air (the pressure was maintained at 0.1 MPa for two minutes). As a result of the leak check, air leakage from the cut end surface of the module was observed but only at three points.

The module was disassembled, and the hollow fiber membranes were removed. For evaluation of the performance of the hollow fiber membranes, the outer surface-equivalent amount of transmitted water was measured. Then, the amount was 490 Um²/hr, indicating substantially no change. Furthermore, the bundle of hollow fiber membranes near the inner end surface of the adhesive fixation layer was removed, and the inner end surface was observed. Then, no gap three times as large as the outer diameter of the hollow fiber membranes was identified in the bundle of hollow fiber membranes or between the bundle of hollow fiber membranes and the straightening cylinder.

Furthermore, the adhesive fixation layer was divided into halves along the longitudinal direction of the hollow fiber membranes, and the thickness of the adhesive fixation layer and the length of the bias regulating members were measured. Then, the thickness of the adhesive fixation layer was 55 mm. The height of the cross plates in the adhesive fixation layer was 38 mm. The height of the insertion rods in the adhesive fixation layer was 43 mm. Thus, when the bias regulating member height/adhesive fixation layer thickness was calculated, 38/55=0.69 for the cross plates, and 43/55=0.78 for the insertion rods. Additionally, the height of the adhesive fixation layer from the inner end surface was 125 mm. The ratio of the height to the inner diameter of the straightening cylinder, 140 mm, was 0.89.

Comparative Example 1

A filtration operation was performed using a hollow fiber membrane module constructed by covering 11600 hollow fiber membranes of polysulfone with a polyethylene net with a wire diameter of 0.5 mm as a contact prevention member, placing the hollow fiber membranes covered with the net in a polysulfone housing, and fixing the housing at the opposite ends thereof with an epoxy resin.

The bias regulating members were inserted into each of the ends of the bundle of hollow fiber membranes as was the case with Example 1 except that only cross shapes (cross plates) of height 85 mm, width 138 mm, and thickness 5 mm were inserted using the same epoxy resin as that used to form the adhesive fixation layers.

The hollow fiber membrane module was attached to a predetermined line to the filtration apparatus, and ultrapure water was filtered as untreated water. As the ultrapure water, water was used which was manufactured by treating river water using microfiltration membranes and using reverse osmosis membranes and an ion exchange resin, and also executing a UV sterilization treatment on the treated water and which had quality indicated by a specific resistance value of 18.1 MΩ·cm and containment of 20000 particulates of at least 0.1 μm per litter.

At this time, the flow rate of water to be treated supplied to the hollow fiber membrane module was set to 25 m$^3$/h by adjusting the opening degree of the pump outlet valve. Of the flow rate, the amount of filtrate was 24.5 m$^3$/h, and the amount of concentrated water was 0.5 m$^3$/h.

Two months after the start of operation, the number of particulates of at least 0.1 pin in the filtrate was measured. Then, the number was 1400 pcs/L. At that point in time, operation was stopped, and a leak check was conducted under an external pressure using air (the pressure was maintained at 0.1 MPa for two minutes). Air leakage from the cut end surface of the module was observed at very many points, specifically, 35 points.

The module was disassembled, and the hollow fiber membranes were removed. For evaluation of the performance of the hollow fiber membranes, the outer surface-equivalent amount of transmitted water was measured. Then, the amount was 490 L/m$^2$/hr, indicating substantially no change. Furthermore, the bundle of hollow fiber membranes near the inner end surface of the adhesive fixation layer was removed, and the inner end surface was observed. Then, gaps three times as large as the outer diameter of the hollow fiber membranes were identified between the hollow fiber membranes, and many hollow fiber membranes were found to be broken near the gaps.

Furthermore, the adhesive fixation layer was divided into halves along the longitudinal direction of the hollow fiber membranes, and the bias regulating member height/adhesive fixation layer thickness was measured. Then, the ratio was 45/55=0.82. Additionally, the height from the inner end surface of the adhesive fixation layer was 125 mm. The ratio of the height to the inner diameter of the straightening cylinder, 140 mm, was 0.89.

Comparative Example 2

A filtration operation was performed using a hollow fiber membrane module constructed by covering 11600 hollow fiber membranes of polysulfone with a polyethylene net with a wire diameter of 0.5 mm as a contact prevention member, placing the hollow fiber membranes covered with the net in a polysulfone housing, and fixing the housing at the opposite ends thereof with an epoxy resin.

The bias regulating members were inserted into each of the ends of the bundle of hollow fiber membranes as was the case with Example 1 except that only cross shapes (cross plates) of height 63 mm, width 138 mm, and thickness 5 mm were inserted using the same epoxy resin as that used to form the adhesive fixation layers.

The hollow fiber membrane module was attached to a predetermined line to the filtration apparatus, and ultrapure water was filtered as untreated water. As the ultrapure water, water was used which was manufactured by treating river water using microfiltration membranes and using reverse osmosis membranes and an ion exchange resin, and also executing a UV sterilization treatment on the treated water and which had quality indicated by a specific resistance value of 18.1 MΩ·cm and containment of 20000 particulates of at least 0.1 μm per litter.

At this time, the flow rate of water to be treated supplied to the hollow fiber membrane module was set to 25 m$^3$/h by adjusting the opening degree of the pump outlet valve. Of the flow rate, the amount of filtrate was 24.5 m$^3$/h, and the amount of concentrated water was 0.5 m$^3$/h.

Two months after the start of operation, the number of particulates of at least 0.1 μm in the filtrate was measured. Then, the number was 800 pcs/L. At that point in time, operation was stopped, and a leak check was conducted under an external pressure using air (the pressure was maintained at 0.1 MPa for two minutes). Air leakage from the cut end surface of the module was observed at very many points, specifically, 20 points.

The module was disassembled, and the hollow fiber membranes were removed. For evaluation of the performance of the hollow fiber membranes, the outer surface-equivalent amount of transmitted water was measured. Then, the amount was 490 L/m$^2$/hr, indicating substantially no change. Furthermore, the bundle of hollow fiber membranes near the inner end surface of the adhesive fixation layer was removed, and the inner end surface was observed. Then, gaps three times as large as the outer diameter of the hollow fiber membranes were identified between the hollow fiber membranes, and many hollow fiber membranes were found to be broken near the gaps.

Furthermore, the adhesive fixation layer was divided into halves along the longitudinal direction of the hollow fiber membranes, and the bias regulating member height/adhesive fixation layer thickness was measured. Then, the ratio was 23/55=0.42. Additionally, the height from the inner end surface of the adhesive fixation layer was 125 mm. The ratio of the height to the inner diameter of the straightening cylinder, 140 mm, was 0.89.

As depicted in Table 1, according to a comparison between Example 1 and Comparative Example 1, the number of particulates of at least 0.1 μm in the filtrate measured two months after the start of operation is 0/L in Example 1 but is very large and 1400/L in Comparative Example 1. Furthermore, air leakage from the cut end surface of the hollow fiber membrane module occurred at 0 point in Example 1 but at 35 points in Comparative Example 1.

Additionally, gaps three times as large as the outer diameter of the hollow fiber membrane in the bundle of hollow fiber membranes or between the bundle of hollow fiber membranes and the straightening cylinder and the breakage of many hollow fiber membranes were not identified in Example 1 but were identified in Comparative Example 1. In this regard, since the value resulting from the division of the height of the bias regulating members (cross plates) by the thickness of the adhesive fixation layer is 0.82, such an effect of the cross plates is strong as forms gaps between the adjacent hollow fiber membranes immediately above (or immediately below) the cross plates. In other words, the gaps in Comparative Example 1 are expected to have been formed immediately above (or immediately below) the cross plates.

On the other hand, the outer surface-equivalent amount of water permeating the hollow fiber membranes which amount was measured two months after the start of operation is equal and 490 (L/m$^2$/hr) in both examples. It is thus expected that the filtration capability of the hollow fiber membranes does not exhibit degradation two months after the start of operation.

Thus, the measurement results in Comparative Example 1 worse than the measurement results in Example 1 are expected not to be due to the degradation of the filtration capability of the hollow fiber membranes themselves but to be due to the presence of gaps three times as large as the outer diameter of the hollow fiber membrane immediately above (or immediately below) the cross plates, which causes a drift to break the hollow fiber membranes.

Next, as depicted in Table 1, according to a comparison between Example 1 and Comparative Example 1, the number of particulates of at least 0.1 μm in the filtrate measured two months after the start of operation is 0/L in Example 1 but 800/L in Comparative Example 2. Furthermore, air leakage from the cut end surface of the hollow fiber membrane module occurred at 0 point in Example 1 but at 20 points in Comparative Example 2. These measured values in Comparative Example 2 are smaller than the measured values in Comparative Example 1 but are still large.

Furthermore, gaps three times as large as the outer diameter of the hollow fiber membrane in the bundle of hollow fiber membranes or between the bundle of hollow fiber membranes and the straightening cylinder and the breakage of many hollow fiber membranes were not identified in Example 1 but were identified in Comparative Example 2. In this regard, since the value resulting from the division of the height of the bias regulating members (cross plates) by the thickness of the adhesive fixation layer is 0.42, such an effect of the cross plates is weak as forms gaps between the adjacent hollow fiber membranes immediately above (or immediately below) the cross plates. In other words, the gaps in Comparative Example 2 are expected to have been formed between the bundle of hollow fiber membranes and the straightening cylinder rather than immediately above (or immediately below) the cross plates.

On the other hand, the outer surface-equivalent amount of water permeating the hollow fiber membranes in Comparative Example 2 is 490 (L/m2/hr), which is equal to the amount in Example 1. It is thus expected that, even in Comparative Example 2, the filtration capability of the hollow fiber membranes does not exhibit degradation.

Thus, the measurement results in Comparative Example 2 worse than the measurement results in Example 1 are expected not to be due to the degradation of the filtration capability of the hollow fiber membranes themselves but to be due to the presence of gaps three times as large as the outer diameter of the hollow fiber membrane between the bundle of hollow fiber membranes and the straightening cylinder, which causes a drift to break the hollow fiber membranes.

In Example 1, the value resulting from the division of the height of the bias regulating members by the thickness of the adhesive fixation layer is 0.55 for the cross plates and 0.64 for the insertion rods. Thus, for the hollow fiber membrane module in Example 1, the value resulting from the division of the height of the bias regulating members by the thickness of the adhesive fixation layer is at least 0.5 and less than 0.8.

Furthermore, as the bias regulating members, the cross plates with a thickness of 5 mm and the cylindrical insertion rods with a diameter of 10 mm are inserted in each of the opposite ends of the bundle of hollow fiber membranes. As a result of disposition of the bias regulating members, the spaces between the hollow fiber membranes on the outer end surface of the adhesive fixation layer are such that the hollow fiber membranes are separated from each other by at least 5 mm along the cross plates and by at least 10 mm at the insertion rods. On the other hand, the outer diameter of the hollow fiber membranes (polysulfone ultrafiltration membranes) is 1.0 mm, and thus, a value three times as large as the outer diameter of the hollow fiber membranes is 3.0 mm. Thus, in the hollow fiber membrane module in Example 1, at least some of the spaces between the hollow fiber membranes formed on the outer end surface of the adhesive fixation layer as a result of disposition of the bias regulating members are at least three times as large as the outer diameter of the hollow fiber membranes. Additionally, according to the results of observation of the inner end surface of the adhesive fixation layer in the hollow fiber membrane module disassembled two months after the start of operation indicate that on the inner end surface of the adhesive fixation layer, the spaces between the hollow fiber membranes and the space from the hollow fiber membranes to the straightening cylinder are all less than three times as large as the outer diameter of the hollow fiber membranes.

Due to the thus configured bias regulating members, Example 1 produces more advantageous effects than Comparative Example 1 and Comparative Example 2 as described above.

Furthermore, as depicted in Table 1, according to a comparison between Example 1 and Example 2, the number of particulates of at least 0.1 μm in the filtrate measured two months after the start of operation is 0 pcs/L in Example 1 but 70 pcs/L in Example 2. Additionally, air leakage from the cut end surface of the hollow fiber membrane module occurred at 0 point in Example 1 but at 2 points in Example 2. These measured values in Example 2 are much smaller than the measured values in Comparative Example 1 and Comparative Example 2 but larger than the measured values in Example 1.

The value resulting from the division of the height of the straightening cylinder from the inner end surface of the adhesive fixation layer by the inner diameter of the straightening cylinder is 0.89 in Example 1 but is 1.25 in Example 2. It is expected that, when this value is at least 1.1 as in Example 2, the flow of water flowing beyond the straightening cylinder into the side of the bundle of hollow fiber membranes becomes large, with the result that the hollow fiber membranes are significantly deflected and are thus likely to be broken.

Due to the thus configured bias regulating members, Example 1 produces more advantageous effects than Example 2 as described above.

The above-described examples indicate that the breakage of the hollow fiber membranes can be reduced by setting the value resulting from the division of the height of the bias regulating members by the thickness of the adhesive fixation layer to at least 0.5 and less than 0.8. It has also been confirmed that the breakage of the hollow fiber membranes can be reduced when at least some of the spaces between the hollow fiber membranes formed on the outer end surface of the adhesive fixation layer as a result of disposition of the bias regulating members are at least three times as large as the outer diameter of the hollow fiber membranes and the spaces between the hollow fiber membranes and the space from the hollow fiber membranes to the straightening cylinder are all less than three times as large as the outer diameter of the hollow fiber membranes on the inner end surface of the adhesive fixation layer. Moreover, the breakage of the hollow fiber membranes can further be reduced by setting the ratio of the height h of the straightening cylinder from the inner end surface of the adhesive fixation layer and the inner diameter d of the straightening cylinder to at least 0.7 and less than 1.1.

TABLE 1

|  | Example 1 | Example 2 | Example 3 | Comparative Example 1 | Comparative Example 2 |
|---|---|---|---|---|---|
| Presence of gaps at least three times as large as the outer diameter of the hollow fiber membranes in the bundle of hollow fiber membranes or between the bundle of hollow fiber membranes and the straightening cylinder and the breakage of many hollow fiber membranes | No | No | No | Yes | Yes |
| Particulates of at least 0.1 μm in the filtrate (the number of particulates/L) | 0 | 70 | 100 | 1400 | 800 |
| Air leakage from the cut end surface of the module (the number of points of air leakage) | 0 | 2 | 3 | 35 | 20 |
| Outer surface-equivalent amount of transmitted water measured two months after the start of operation (L/m$^2$/hr) | 490 | 490 | 490 | 490 | 490 |
| Bias regulating member (cross plate) height (mm) | 30 | 30 | 38 | 45 | 23 |
| Adhesive fixation layer thickness (mm) | 55 | 55 | 55 | 55 | 55 |
| Value resulting from division of the bias regulating member height by the adhesive fixation layer thickness | 0.55 | 0.55 | 0.69 | 0.82 | 0.42 |
| Bias regulating member (insertion rod) height (mm) | 35 | 35 | 43 | — | — |
| Adhesive fixation layer thickness (mm) | 55 | 55 | 55 | — | — |
| Value resulting from division of the bias regulating member height by the adhesive fixation layer thickness | 0.64 | 0.64 | 0.78 | — | — |
| Height of the straightening cylinder from the inner end surface of the adhesive fixation layer (mm) | 125 | 175 | 125 | 125 | 125 |
| Inner diameter of the straightening cylinder (mm) | 140 | 140 | 140 | 140 | 140 |
| Value resulting from division of the height of the straightening cylinder from the inner end surface of the adhesive fixation layer by the inner diameter of the straightening cylinder | 0.89 | 1.25 | 0.89 | 0.89 | 0.89 |

With the hollow fiber membrane module and the external-pressure filtration method using the hollow fiber membrane module according to the present embodiment, a hollow fiber membrane module is provided which can have an extended life in spite of no increase in production costs due to substantially no change made to the components or the manufacturing process. The external-pressure filtration method using the hollow fiber membrane module enables filtrate with high water quality to be manufactured over a long period of time. This method is particularly suitable as a final filter used for ultrapure water manufacturing facilities.

What is claimed is:

1. A hollow fiber membrane module comprising:
a bundle of hollow fiber membranes comprising a plurality of hollow fiber membranes;
a housing that houses the bundle of hollow fiber membranes;
an adhesive fixation layer that adhesively fixes the bundle of hollow fiber membranes to the housing at opposite ends of the bundle;
an inlet and outlet for a fluid provided on the housing;
at least one bias regulating member disposed in at least one end of the bundle of hollow fiber membranes in order to reduce a bias of a density distribution of the hollow fiber membranes in the bundle of hollow fiber membranes; and
at least one straightening cylinder surrounding a part of one of the opposite ends of the bundle of hollow fiber membranes, wherein
a part of the at least one straightening cylinder is fixed to the adhesive fixation layer,
the at least one bias regulating member is contained in the adhesive fixation layer,
the adhesive fixation layer comprises an outer end surface in which the hollow fiber membranes are open and an inner end surface disposed opposite the outer end surface and inside the at least one straightening cylinder,
at the outer end surface of the adhesive fixation layer, at least some of spaces between the hollow fiber membranes formed as a result of disposition of the at least one bias regulating member are at least three times as large as an outer diameter of the hollow fiber membranes, and
at the inner end surface of the adhesive fixation layer, all of spaces between the hollow fiber membranes and a space from the hollow fiber membranes to the at least one straightening cylinder are all less than three times as large as the outer diameter of the hollow fiber membranes.

2. The hollow fiber membrane module according to claim 1, wherein
a value resulting from division of a height of the at least one bias regulating member by a thickness of the adhesive fixation layer is at least 0.5 and less than 0.8.

3. The hollow fiber membrane module according to claim 1, wherein
a plurality of types of the at least one bias regulating members with different shapes are disposed in the adhesive fixation layer so as to be combined together.

4. The hollow fiber membrane module according to claim 1, wherein
the at least one bias regulating member comprises plate bias regulating members shaped like plates and rod bias regulating members shaped like rods that are disposed in the adhesive fixation layer so as to be combined together, and
a value resulting from division of a height of the rod bias regulating members by the thickness of the adhesive fixation layer is larger than a value resulting from division of a height of the plate bias regulating members by the thickness of the adhesive fixation layer.

5. The hollow fiber membrane module according to claim 4, wherein
the value resulting from the division of the height of the plate bias regulating members by the thickness of the adhesive fixation layer is at least 0.5 and less than 0.7 and the value resulting from the division of the height of the rod bias regulating members by the thickness of the adhesive fixation layer may be at least 0.6 and less than 0.8.

6. The hollow fiber membrane module according to claim 1, wherein
a ratio between a height h of the at least one straightening cylinder from the inner end surface of the adhesive fixation layer and an inner diameter d of the at least one straightening cylinder is at least 0.7 and less than 1.1.

7. The hollow fiber membrane module according to claim 1, wherein
an inner end surface side of the at least one bias regulating member is tapered.

8. A filtration method using the hollow fiber membrane module according to claim 1, the method comprising:
supplying water to be treated to an area outside the hollow fiber membranes in the housing and retrieving treated water having permeated the hollow fiber membranes through openings of the hollow fiber membranes.

9. The filtration method according to claim 8, wherein the treated water is ultrapure water.

10. The filtration method according to claim 8, wherein a value resulting from division of a height of the at least one bias regulating member by a thickness of the adhesive fixation layer is at least 0.5 and less than 0.8.

11. The filtration method according to claim 8, wherein a plurality of types of the at least one bias regulating members with different shapes are disposed in the adhesive fixation layer so as to be combined together.

12. The filtration method according to claim 8, wherein the at least one bias regulating member comprises plate bias regulating members shaped like plates and rod bias regulating members shaped like rods that are disposed in the adhesive fixation layer so as to be combined together, and a value resulting from division of a height of the rod bias regulating members by a thickness of the adhesive fixation layer is larger than a value resulting from division of a height of the plate bias regulating members by the thickness of the adhesive fixation layer.

13. The filtration method according to claim 12, wherein the value resulting from the division of the height of the plate bias regulating members by the thickness of the adhesive fixation layer is at least 0.5 and less than 0.7 and the value resulting from the division of the height of the rod bias regulating members by the thickness of the adhesive fixation layer may be at least 0.6 and less than 0.8.

14. The filtration method according to claim 8, wherein a ratio between a height h of the at least one straightening cylinder from the inner end surface of the adhesive fixation layer and an inner diameter d of the at least one straightening cylinder is at least 0.7 and less than 1.1.

15. The filtration method according to claim 8, wherein an inner end surface side of the at least one bias regulating member is tapered.

* * * * *